(12) United States Patent
Gronvall et al.

(10) Patent No.: US 8,718,434 B2
(45) Date of Patent: May 6, 2014

(54) CABLE ENCLOSURE WITH SEALED CABLE ENTRY PORT

(75) Inventors: Erik Gronvall, Bloomington, MN (US); Dustin Tichy, Prior Lake, MN (US); Paula Rudenick, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 939 days.

(21) Appl. No.: 12/495,393

(22) Filed: Jun. 30, 2009

(65) Prior Publication Data

US 2010/0027954 A1 Feb. 4, 2010

Related U.S. Application Data

(60) Provisional application No. 61/077,240, filed on Jul. 1, 2008.

(51) Int. Cl.
*G02B 6/00* (2006.01)
(52) U.S. Cl.
USPC ............................. 385/135; 385/136; 385/139
(58) Field of Classification Search
USPC ....................... 385/92, 94, 134–137, 139, 147
See application file for complete search history.

(56) References Cited

U.S. PATENT DOCUMENTS

| | | |
|---|---|---|
| 4,849,580 A | 7/1989 | Reuter |
| 4,954,098 A | 9/1990 | Hollingsworth et al. |
| 5,323,480 A | 6/1994 | Mullaney et al. |
| 5,397,859 A | 3/1995 | Robertson et al. |
| 5,410,105 A | 4/1995 | Tahara et al. |
| 5,446,823 A | 8/1995 | Bingham et al. |
| 5,556,060 A | 9/1996 | Bingham et al. |
| 5,569,882 A | 10/1996 | Yokoyama et al. |
| 5,777,268 A | 7/1998 | Allen et al. |
| 5,796,041 A | 8/1998 | Suzuki et al. |
| 5,828,005 A | 10/1998 | Huynh-Ba et al. |
| 6,046,406 A | 4/2000 | Milanowski et al. |
| 6,111,201 A | 8/2000 | Drane et al. |
| 6,652,312 B2 | 11/2003 | Liegl et al. |
| 7,013,074 B2 | 3/2006 | Battey et al. |
| 7,477,826 B2 | 1/2009 | Mullaney et al. |
| 7,751,675 B2 | 7/2010 | Holmberg et al. |
| 2006/0261560 A1 | 11/2006 | Radliff et al. |
| 2009/0238531 A1 | 9/2009 | Holmberg et al. |
| 2010/0027954 A1 | 2/2010 | Gronvall et al. |
| 2010/0296792 A1 * | 11/2010 | Bannister ...................... 385/136 |
| 2013/0034333 A1 | 2/2013 | Holmberg et al. |

FOREIGN PATENT DOCUMENTS

| | | |
|---|---|---|
| EP | 0 442 941 | 1/1995 |
| EP | 0 587 616 | 7/1996 |
| JP | 63089809 A | 4/1988 |
| JP | 5315020 A | 11/1993 |

* cited by examiner

*Primary Examiner* — Rhonda Peace
(74) *Attorney, Agent, or Firm* — Merchant & Gould P.C.

(57) ABSTRACT

This disclosure describes a fiber optic enclosure in which a cable entry port is sealed using a wedge that compresses a gasket that surrounds a fiber optic cable. As described herein, a fiber optic enclosure may include one or more entry ports through which fiber optic cables pass. As one of the fiber optic cables passes through one of the entry ports, the fiber optic cable passes through a gasket located in a receptacle behind the cable entry port. A wedge compresses the gasket, thereby compressing the gasket. When the gasket is compressed, the gasket exerts radial pressure on the fiber optic cable. In this way, the gasket forms a seal around the fiber optic cable.

19 Claims, 14 Drawing Sheets

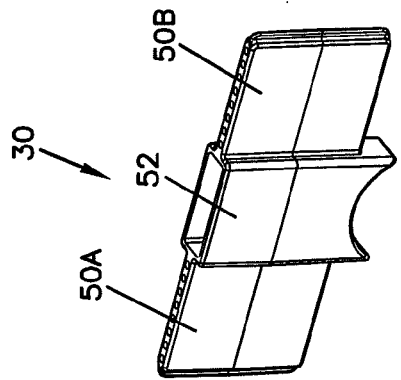
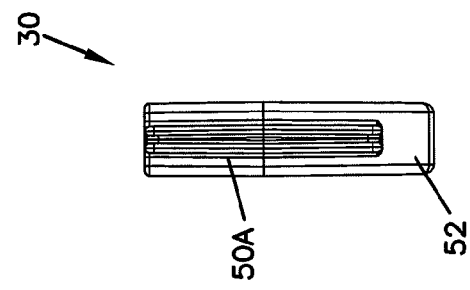
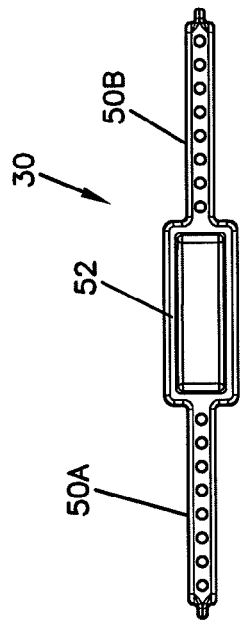
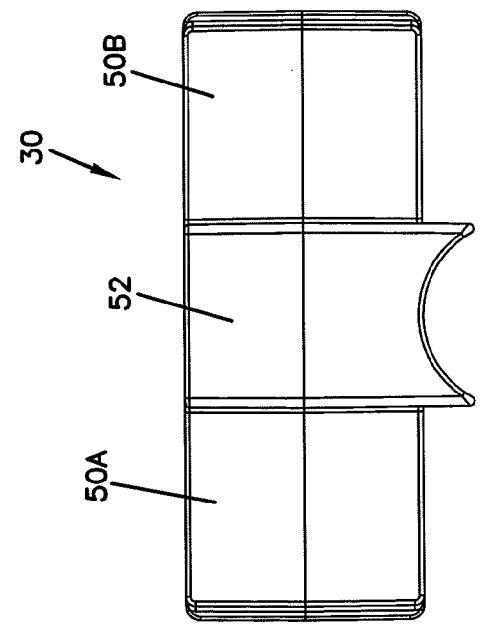

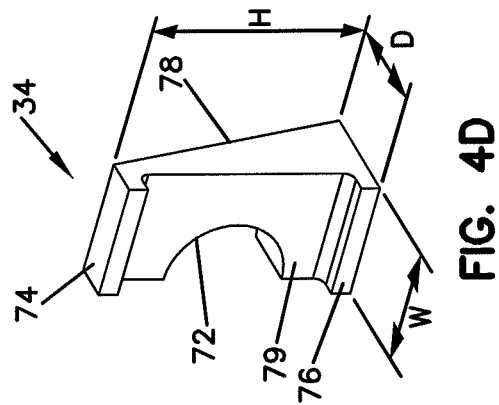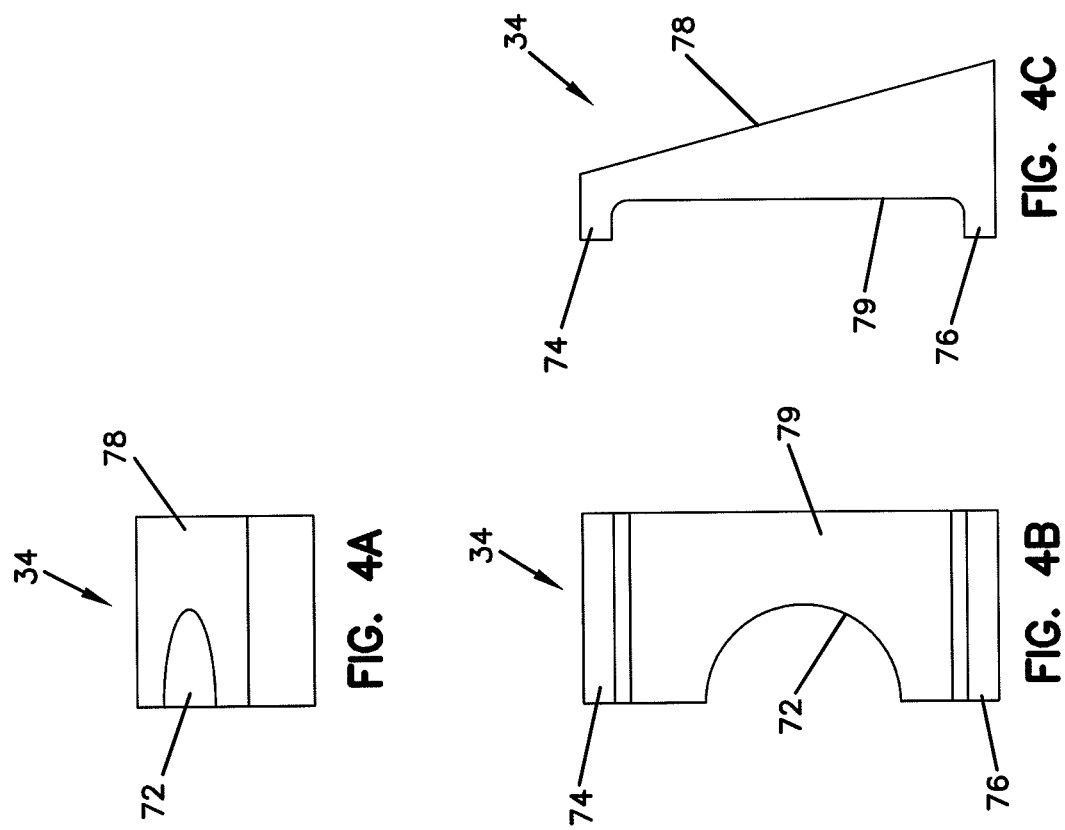

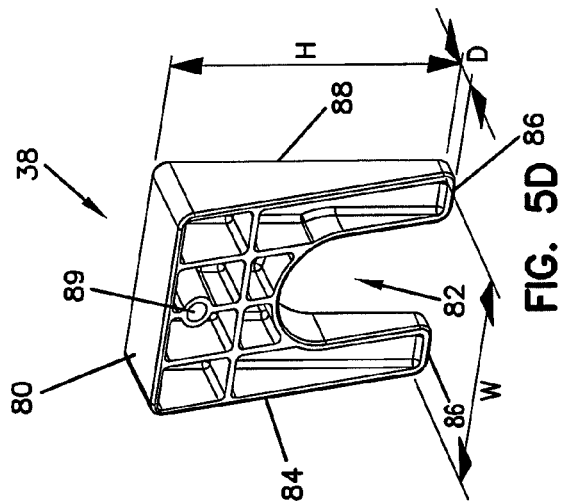
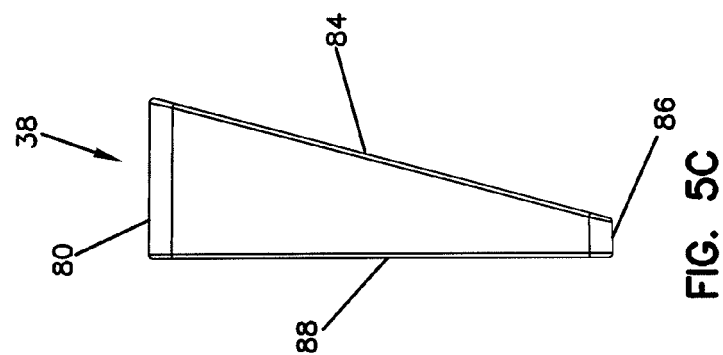
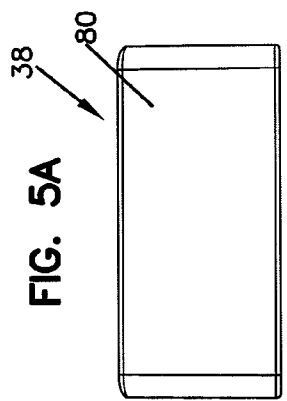
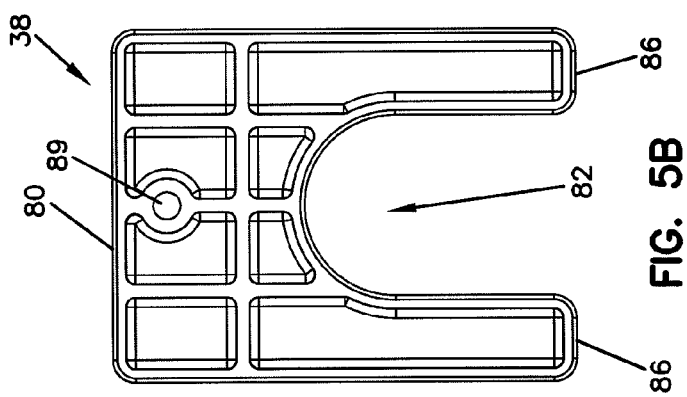

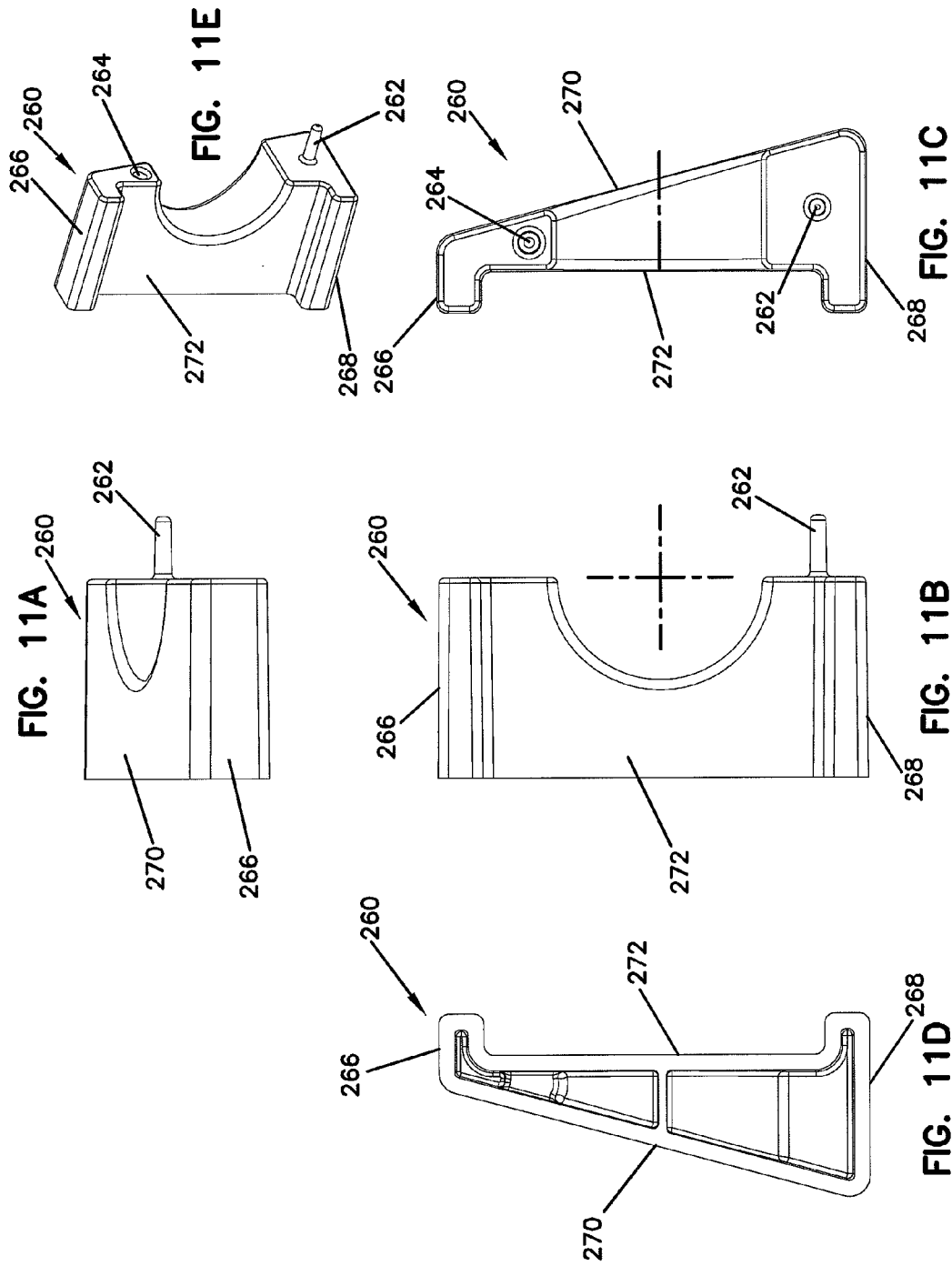

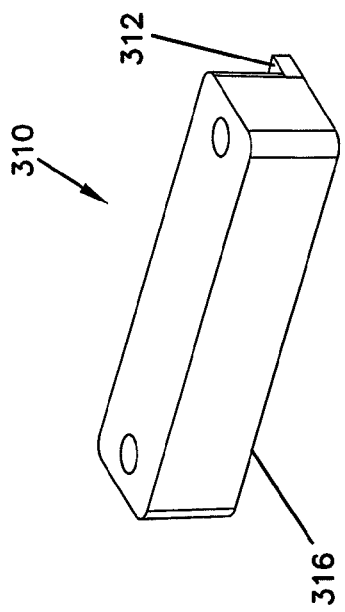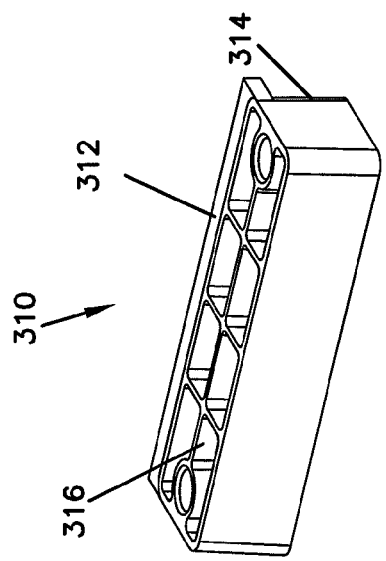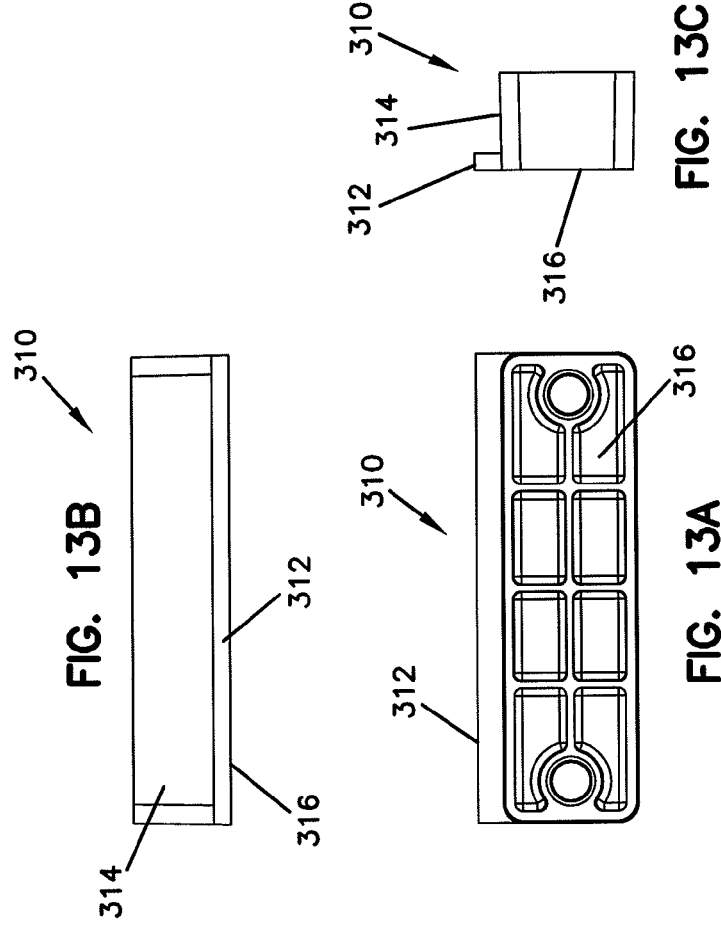

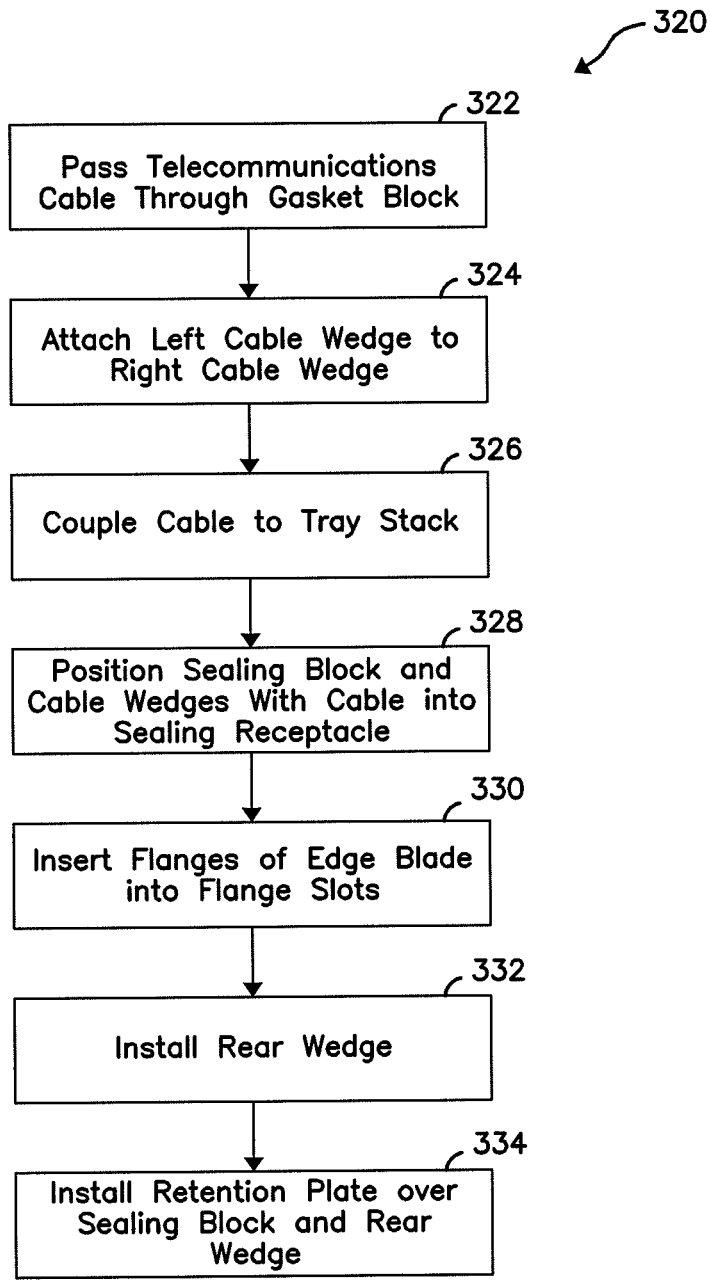

CABLE ENCLOSURE WITH SEALED CABLE ENTRY PORT

CROSS REFERENCE TO RELATED APPLICATION

The present application claims the benefit of U.S. Provisional Patent Application Ser. No. 61/077,240, filed Jul. 1, 2008, which application is hereby incorporated by reference in its entirety.

TECHNICAL FIELD

The present disclosure relates generally to fiber optic cable networks. More specifically, the present disclosure relates to cable enclosures used in fiber optic cable networks.

BACKGROUND

In many traditional communications networks, fiber optic cables have been used to carry data long distances between telecommunication company installations. In such traditional communications networks, other types of cables, such as copper wire loops and coaxial cables, have been used to carry data from telecommunication company installations to homes and businesses. Recently, there has been a movement to extend the fiber optic portion of the communications networks closer to homes and businesses. In some circumstances, the fiber optic portions of the communications networks extend into to the homes and businesses themselves.

Extending the fiber optic portion of a communications network closer to homes and businesses has necessitated the deployment of Optical Termination Enclosures (OTEs). An OTE is an enclosure that is designed to facilitate splicing and termination of one or more fiber optic cables. A typical OTE has a set of cable entry ports through which fiber optic cables enter the OTE. For instance, an OTE may have eight cable entry ports. One or more of the cable entry ports may accommodate "feeder" cables that connect to upstream points, such as telecommunication company installations, in a communications network. One or more of the other cable entry ports may accommodate "drop" cables that connect to downstream points in the communications network, such as homes and businesses.

OTEs are frequently mounted on utility poles, walls, utility boxes, and other outdoor surfaces. Because OTEs are mounted outdoors, they are exposed to various environmental elements such as heat, cold, dust, sunlight, rain, snow, plants, animals, and so on. Because the splicing and termination capabilities of an OTE would be destroyed or impaired if such environmental elements were permitted to access the interior of the OTE, it is important to ensure that such environmental elements are not permitted to access the interior of the OTE.

SUMMARY

This disclosure describes a fiber optic enclosure in which a cable entry port is sealed using a wedge that compresses a gasket that surrounds a fiber optic cable. As described herein, a fiber optic enclosure may include one or more entry ports through which fiber optic cables pass. As one of the fiber optic cables passes through one of the entry ports, the fiber optic cable passes through a gasket located in a receptacle behind the cable entry port. A wedge compresses the gasket, thereby compressing the gasket. When the gasket is compressed, the gasket exerts radial pressure on the fiber optic cable. In this way, the gasket forms a seal around the fiber optic cable.

For example, an optical termination enclosure (OTE) may comprise a base member and a lid. An outer wall of the base member is shaped to form an arch-like cable entry port designed to accommodate a telecommunications cable. Furthermore, the base member is shaped to define a sealing receptacle interior to the cable entry port. When a telecommunications cable is installed through the cable entry port, the telecommunications cable passes through a gasket block, a cable wedge, and a rear wedge that are positioned within the sealing receptacle. The rear wedge exerts force on the cable wedge and the cable wedge exerts force on the gasket block. The gasket block, being confined within the sealing receptacle, is compressed due to the force exerted by the cable wedge, thereby forming a seal around the telecommunications cable.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2A illustrates a top plan view of an edge blade.
FIG. 2B illustrates a front elevation view of the edge blade.
FIG. 2C illustrates a side elevation view of the edge blade.
FIG. 2D illustrates a perspective view of the edge blade.
FIG. 4A illustrates a top plan view of a right cable wedge.
FIG. 4B illustrates a front elevation view of the right cable wedge.
FIG. 4C illustrates a right side elevation view of the right cable wedge.
FIG. 4D illustrates a perspective view of the right cable wedge.
FIG. 5A illustrates a top plan view of a rear wedge.
FIG. 5B illustrates a front elevation view of the rear wedge.
FIG. 5C illustrates a side elevation view of the rear wedge.
FIG. 5D illustrates a perspective view of the rear wedge.

FIG. 11A illustrates a top plan view of an alternate left cable wedge.

FIG. 11B illustrates a front elevation view of the alternate left cable wedge of FIG. 11A.

FIG. 11C illustrates a right side elevation view of the alternate left cable wedge of FIG. 11A.

FIG. 11D illustrates a left side elevation view of the alternate left cable wedge of FIG. 11A.

FIG. 11E illustrates a perspective view of the alternate left cable wedge of FIG. 11A.

FIG. 13A is a top plan view of an alternate retention plate.

FIG. 13B is a rear elevation view of the alternate retention plate of FIG. 13A.

FIG. 13C is a side elevation view of the alternate retention plate of FIG. 13A.

FIG. 13D is a perspective view of the bottom side of the alternate retention plate of FIG. 13A.

FIG. 13E is a perspective view of the top side of the alternate retention plate of FIG. 13A.

FIG. 14 is a flowchart illustrating an alternate example installation process that may be performed using the alternate retention plate illustrated in the FIGS. 13A through 13E.

DETAILED DESCRIPTION

Figure 1:
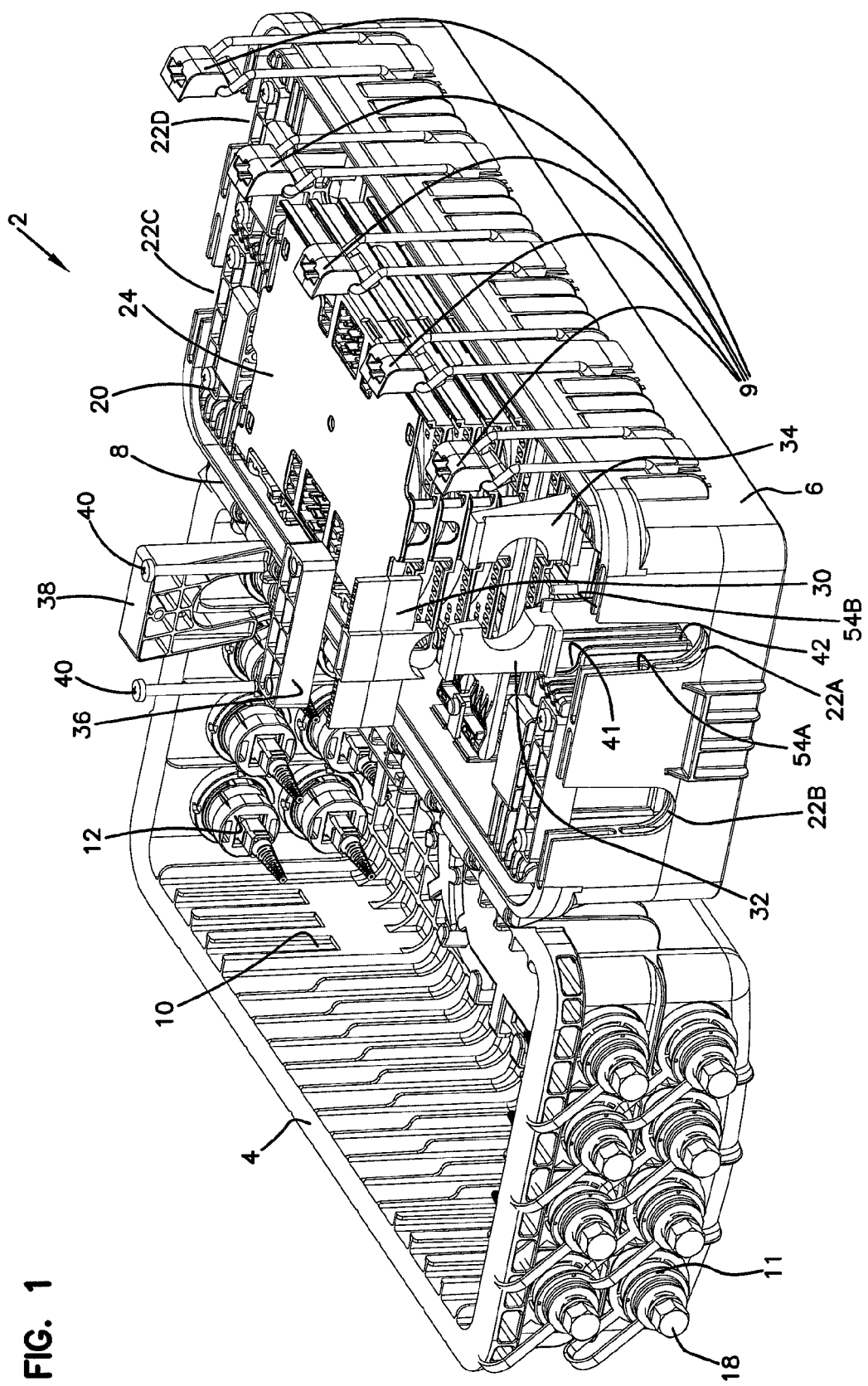
FIG. 1 is a perspective view of an example optical termination enclosure.

As described herein, the techniques of this disclosure may be implemented in many ways. For instance, the techniques of this disclosure may be implemented as an optical termination enclosure (OTE) comprising a base member that defines an inner cavity, a sealing receptacle, and a cable entry port through which a telecommunications cable passes. The OTE also comprises a gasket block positioned within the sealing receptacle, the gasket block defining a cable aperture through which the telecommunications cable passes. A bottom surface of the gasket block is flush with a floor of the sealing receptacle, a front surface of the gasket block is flush with an outer wall of the sealing receptacle, and side surfaces of the gasket block are flush with side walls of the sealing receptacle. In addition, the OTE comprises a retention plate that is installed over the gasket block such that a bottom surface of the retention plate is flush with a top surface of the gasket block. Furthermore, the OTE comprises a cable wedge positioned within the sealing receptacle interior to the gasket block, the cable wedge defining an aperture through which the telecommunications cable passes. A bottom surface of the cable wedge is flush with the floor of the sealing receptacle, a front surface of the cable wedge abuts a rear surface of the gasket block, and a rear surface of the cable wedge forms an obtuse angle with a top surface of the cable wedge and the rear surface of the cable wedge forms an acute angle with the bottom surface of the cable wedge. In addition, the OTE comprises a rear wedge positioned within the sealing receptacle interior to the gasket block, the rear wedge defining an indentation through which the telecommunications cable passes. A rear surface of the rear wedge is flush with an inner wall of the sealing receptacle. A front surface of the rear wedge forms an acute angle with a top surface of the rear wedge and the front surface of the rear wedge forms an obtuse angle with a bottom surface of the rear wedge. The front surface of the rear wedge exerts force against the rear surface of the cable wedge, the front surface of the cable wedge exerts force against the rear surface of the gasket block, and the front surface of the gasket block exerts force against an outer wall of the sealing receptacle. Countervailing force exerted by the outer wall of the sealing receptacle against the front surface of the gasket block and the force exerted by the front surface of the cable wedge axially compress the gasket block, thereby radially constricting the cable aperture in the gasket block forming a seal around the telecommunication cable passing through the gasket block.

In another instance, the techniques of this disclosure may be implemented as a method of installing a telecommunications cable in an optical termination enclosure. The method comprises passing the telecommunications cable through a cable aperture defined by a gasket block. The method also comprises passing the telecommunications cable through an aperture defined by a cable wedge such that a front surface of the cable wedge abuts a rear surface of the gasket block, wherein a rear surface of the cable wedge forms an obtuse angle with a top surface of the cable wedge and an acute angle with the bottom surface of the cable wedge. In addition, the method comprises coupling an end of the telecommunications cable to an optical processing tray housed within the optical termination enclosure. Furthermore, the method comprises positioning the gasket block and the cable wedge into a sealing receptacle defined by a base member of the optical termination enclosure such that a bottom surface of the gasket block and a bottom surface of the cable wedge are flush with a floor of the sealing receptacle, such that side surfaces of the gasket block and side surfaces of the cable wedge are flush with side walls of the sealing receptacle, and such that the telecommunications cable extends through a cable entry port defined by an outer wall of the base member, the outer wall of the base member forming an outer wall of the sealing receptacle. The method also comprises, after the gasket block and the cable wedge are positioned into the sealing receptacle, installing a retention plate over the gasket block, thereby inhibiting the gasket block from moving in a direction away from the floor of the sealing receptacle. In addition, the method comprises, installing a rear wedge such that a front surface of the rear wedge abuts the rear surface of the cable wedge and such that a rear surface of the rear wedge abuts an inner wall of the sealing receptacle. The front surface of the rear wedge forms an acute angle with a top surface of the rear wedge and an obtuse angle with a bottom surface of the rear wedge. When the rear wedge is installed, the front surface of the rear wedge exerts force against the rear surface of the cable wedge, the front surface of the cable wedge exerts force against the rear surface of the gasket block, and the front surface of the gasket block exerts force against the outer wall of the sealing receptacle. Countervailing force exerted by the outer wall of the sealing receptacle against the front surface of the gasket block and the force exerted by the front surface of the cable wedge axially compress the gasket block, thereby radially constricting the cable aperture in the gasket block forming a seal around the telecommunication cable passing through the gasket block.

In another instance, the techniques of this disclosure may be implemented as a method that comprises passing a fiber optic cable through an entry port of a fiber optics enclosure. The method also comprises passing the fiber optic cable through a gasket positioned in a receptacle interior to the entry port. Furthermore, the method comprises sealing the entry port by installing a sealing wedge into the receptacle, thereby compressing the gasket.

FIG. 1 is a perspective view of an example optical termination enclosure (OTE) 2. As illustrated in FIG. 1, OTE 2 includes a lid member 4 and a base member 6. The lid member 4 and the base member 6 may be constructed of a variety of different types of materials including plastic, metal, and other types of materials. Hinges 8 pivotally attach the lid member 4 to the base member 6. When the lid member 4 is rotated relative to the axis of the hinges 8, the interior of the OTE 2 may be exposed or concealed. In the example of FIG. 1, the interior of the OTE 2 is exposed. A set of latches 9 attached to the base member 6 may be used to secure the lid member 4 to the base member 6.

The lid member 4 is shaped such that the lid member 4 defines an inner cavity 10. Two sets of fiber optic adapters are grouped on opposite ends of the lid member 4. For reasons of clarity, only the fiber optic adapter 11 is labeled in FIG. 1. Each of the fiber optic adapters includes an inner port positioned within the inner cavity 10 of lid member 4. For reasons of clarity, only the inner port 12 is labeled in FIG. 1. Furthermore, each of the fiber optic adapters includes an outer port positioned outside the inner cavity 10 of the lid member 4. As illustrated in the example of FIG. 1, each of the outer ports of the fiber optic adapters is covered by one of protective dust caps 14. When the OTE 2 is in use, the dust caps 14 may be removed and connectorized ends of drop cables may be inserted into the outer ports of the fiber optic adapters. Although not illustrated in the example of FIG. 1, connectorized ends of jacketed optical fibers may be inserted into the inner ports of the fiber optic adapters. By inserting the connectorized ends of the drop cables into the outer ports of the fiber optic adapters, the drop cables are optically connected to the optical fibers inserted into the inner ports of the fiber optic adapters.

The base member 6 is shaped such that the base member 6 defines an inner cavity 20. Furthermore, the base member 6 is shaped to include a cable entry port 22A, a cable entry port 22B, a cable entry port 22C, and a cable entry port 22D (collectively, "cable entry ports 22"). Each of the cable entry ports 22 is arch-shaped and is wide enough to accommodate a telecommunications cable. The telecommunications cable may be a wide variety of optical telecommunications cables, including single-mode optical cables, multi-mode optical cables, drop cables, and other types of telecommunications cables. When the OTE 2 is in use, a telecommunications cable passes through each of the cable entry ports 22. Opposite ends of the telecommunications cables passing through the cable entry ports 22 of the OTE 2 may connect to upstream data distribution points or downstream data distribution points.

The inner cavity 20 of the base member 6 houses a tray stack 24 that includes at least one optical processing tray. In one example implementation, the tray stack 24 includes a splitter tray and a plurality of splice trays. One or more splitters can be mounted on the splitter tray. The jacketed optical fibers inserted into the inner ports of the fiber optic adapters (e.g., inner port 12) may connect to the splitters mounted on the splitter tray. One or more of the optical fibers in the telecommunications cables that pass through cable entry ports 22 may be optically coupled to the jacketed optical fibers at splices that are held at ones of the splice trays in the tray stack 24. Alternatively, optical fibers of the telecommunications cables that pass through the cable entry ports 22 may be optically connected to a splitter at the splitting tray. The splitter splits signals carried by the optical fiber to a plurality of the jacketed optical fibers inserted into the inner ports of the fiber optical adapters. In this way, data carried by one of the telecommunications cables may pass through the splice trays and/or the splitter tray of the tray stack 24 and be retransmitted on an appropriate one of the drop cables or another one of the telecommunications cables. Likewise, data carried by one of the drop cables may pass through the splitter tray and one or more of the splice trays of the tray stack 24 and be retransmitted on an appropriate one of the telecommunications cables.

In some circumstances, a telecommunications cable that passes into the OTE 2 through a first one of the cable entry ports 22 may pass out of the OTE 2 through a second one of the cable entry ports 22. For example, a telecommunications cable may pass into the OTE 2 through the cable entry port 22A and may pass out of OTE 2 through the cable entry port 22D. Jacketing of the telecommunications cable may be removed from the portion of the telecommunications cable that is inside the OTE 2. In this way, one or more of the optical fibers of the telecommunications cable may be attached to the tray stack 24 while the remaining optical fibers of the telecommunications cable may pass through the OTE 2 and pass out of the OTE 2 through the second one of the cable entry ports 22.

The example of FIG. 1 illustrates an edge blade 30, a left cable wedge 32, a right cable wedge 34, a retention plate 36, a rear wedge 38, and fasteners 40. In the example of FIG. 1, the edge blade 30, the left cable wedge 32, the right cable wedge 34, the retention plate 36, the rear wedge 38, and the fasteners 40 are shown in an exploded view to illustrate their relative sizes and approximate positions within the OTE 2 when assembled. The fasteners 40 may be a wide variety of different types of fasteners including: screws, bolts, rivets, adhesive columns, dowels, nails, screw-bolts, and other types of fasteners. The edge blade 30, the left cable wedge 32, the right cable wedge 34, the retention plate 36, and the rear wedge 38 may be constructed of a variety of rigid materials including plastic, metal, ceramic, and/or other materials.

The example of FIG. 1 also illustrates that base member 6 is shaped to define a retention plate receptacle 41, a sealing receptacle 42, a left flange slot 54A, and a right flange slot 54B. This disclosure explains the purposes and dimensions of the retention plate receptacle 41, the sealing receptacle 42, the left flange slot 54A, and the right flange slot 54B with reference to the following figures.

FIGS. 2A through 2D illustrate views of the edge blade 30: FIG. 2A illustrates a top plan view of the edge blade 30; FIG. 2B illustrates a front elevation view of the edge blade 30; FIG. 2C illustrates a side elevation view of the edge blade 30; and FIG. 2D illustrates a perspective view of the edge blade 30.

As illustrated in the example of FIG. 2A, the edge blade 30 comprises a left flange 50A, a right flange 50B, and a body 52. The left flange 50A and the right flange 50B are connected to opposite ends of the body 52. The left flange 50A is shaped such that when the edge blade 30 is inserted into the cable entry port 22A, the left flange 50A fits snugly within the left flange slot 54A defined by the base member 6. Similarly, the right flange 50B is shaped such that when the edge blade 30 is inserted into the cable entry port 22A, the right flange 50B fits snugly within the right flange slot 54B defined by the base member 6. When the edge blade 30 is inserted into the cable entry port 22A, the body 52 of the edge blade 30 fits snugly into the cable entry port 22A. As is apparent in the example of FIG. 2A, the body 52 of the edge blade 30 is thicker than the left flange 50A and the right flange 50B. Because the body 52 of the edge blade 30 is thicker than the left flange 50A and the right flange 50B, the body 52 of the edge blade 30 may be approximately as thick as an outer wall of the base member 6.

As illustrated in the example of FIG. 2B, a bottom portion of the body 52 of the edge blade 30 is shaped as an arc. The radius of this arc may be approximately equal to the radius of a telecommunications cable. For this reason, when the edge blade 30 is inserted into the cable entry port 22A, the arc formed by the bottom portion of the body 52 of the edge blade 30 and the arc formed by the bottom portion of the cable entry port 22A may form a complete circle around a telecommunications cable.

Figure 3D:
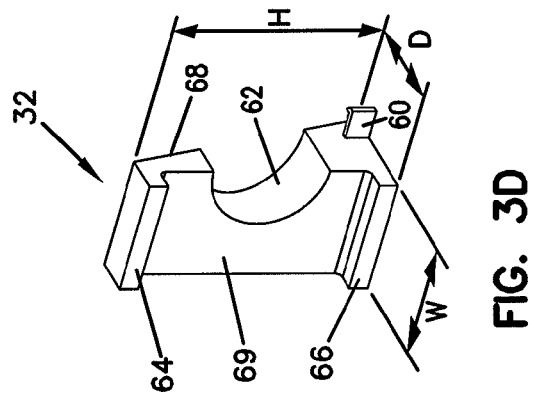
FIG. 3D illustrates a perspective view of the left cable wedge.
Figure 3C:
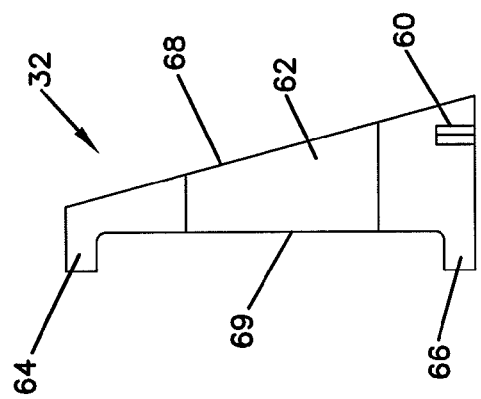
FIG. 3C illustrates a right side elevation view of the left cable wedge.
Figure 3A:
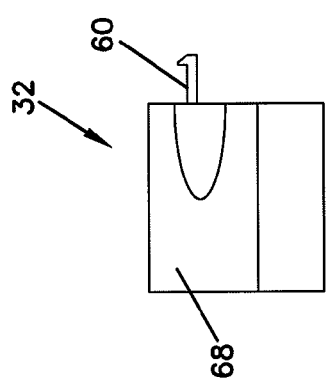
FIG. 3A illustrates a top plan view of a left cable wedge.
Figure 3B:
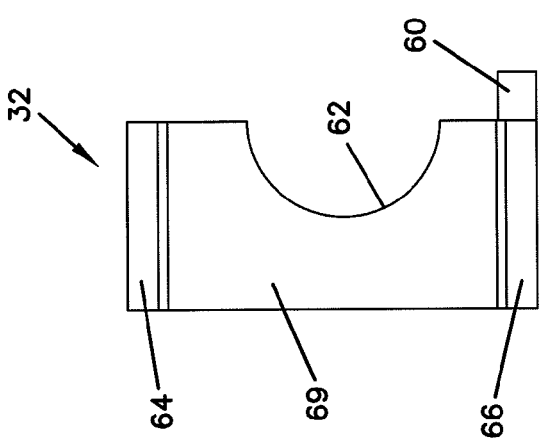
FIG. 3B illustrates a front elevation view of the left cable wedge.

FIGS. 3A through 3D illustrate views of the left cable wedge 32: FIG. 3A illustrates a top plan view of the left cable wedge 32; FIG. 3B illustrates a front elevation view of the left cable wedge 32; FIG. 3C illustrates a right side elevation view of the left cable wedge 32; and FIG. 3D illustrates a perspective view of the left cable wedge 32.

FIG. 3A and FIG. 3C illustrate that the left cable wedge 32 has a top surface that has less depth than its bottom surface. Consequently, a rear surface 68 of the left cable wedge 32 is slanted relative to a front surface 69 of the left cable wedge 32. In other words, the rear surface 68 of the left cable wedge 32 forms an obtuse angle with the top surface of the left cable wedge 32 and an acute angle with the bottom surface of the left cable wedge 32

Furthermore, FIG. 3A illustrates that the left cable wedge 32 has a latch 60 that protrudes from the right side of the left cable wedge 32. FIG. 3B and FIG. 3D illustrate that the right side of the left cable wedge 32 has a semi-circular indentation 62. The radius of the semi-circular indentation 62 may be substantially equal to the radius of a telecommunications cable. FIG. 3C and FIG. 3D also illustrate that the left cable wedge 32 includes a top flange 64 and a bottom flange 66. The top flange 64 extends horizontally from the junction of the top surface of the left cable wedge 32 and the front surface 69 of the left cable wedge 32. The bottom flange 66 extends horizontally from the junction of the bottom surface of the left cable wedge 32 and the front surface 69 of the left cable wedge 32. Although the top flange 64 and the bottom flange 66 are illustrated in the example of FIG. 3A as having a square profile, it should be appreciated that the top flange 64 and/or the bottom flange 66 may have other types of profiles including triangular profiles, curvilinear profiles, rectangular profiles, and other types of profiles.

FIGS. 4A through 4D illustrate views of the right cable wedge 34: FIG. 4A illustrates a top plan view of the right cable wedge 34; FIG. 4B illustrates a front elevation view of the right cable wedge 34; FIG. 4C illustrates a right side elevation view of the right cable wedge 34; and FIG. 4D illustrates a perspective view of the right cable wedge 34.

FIG. 4A and FIG. 4C illustrate that the right cable wedge 34 has a top surface that has less depth than the bottom surface of the right cable wedge 34. Consequently, a rear surface 78 of the right cable wedge 34 is slanted relative to a front surface 79 of the right cable wedge 34. In other words, the rear surface 78 of the right cable wedge 34 forms an obtuse angle with a top surface of the right cable wedge 34 and an acute angle with the bottom surface of the right cable wedge 34

FIG. 4B and FIG. 4D illustrate that the left side of the right cable wedge 34 has a semi-circular indentation 72. The radius of the semi-circular indentation 72 may be substantially equal to the radius of a telecommunications cable. Consequently, when the right side of the left cable wedge 32 is positioned against the left side of the right cable wedge 34, the semi-circular indentation 62 of the left cable wedge 32 and the semi-circular indentation 72 of the right cable wedge 34 form a complete circle around the telecommunications cable. FIG. 4C and FIG. 4D also illustrate that the right cable wedge 34 includes a top flange 74 and a bottom flange 76. The top flange 74 extends horizontally from the junction of the top surface of the right cable wedge 34 and the front surface 79 of the right cable wedge 34. The bottom flange 76 extends horizontally from the junction of the bottom surface of the right cable wedge 34 and the front surface 79 of the right cable wedge 34.

Although not illustrated in the examples of FIGS. 4A through 4D, the left side of the right cable wedge 34 may include an aperture designed to accommodate the latch 60 of the left cable wedge 32 in a snap-fit connection. When the latch 60 of the left cable wedge 32 is inserted into the aperture on the left side of the right cable wedge 34, the left cable wedge 32 and the right cable wedge 34 latch together such that the top surfaces of the left cable wedge 32 and the right cable wedge 34 are aligned, the front surfaces of the left cable wedge 32 and the right cable wedge 34 are aligned, and the semi-circular indentation 62 of the left cable wedge 32 and the semi-circular indentation 72 of the right cable wedge 34 form a circular aperture through the combined cable wedges. When the left cable wedge 32 is attached to the right cable wedge 34, the left cable wedge 32 and the right cable wedge 34 form a completed cable wedge.

FIGS. 5A through 5D illustrate views of the rear wedge 38: FIG. 5A illustrates a top plan view of the rear wedge 38; FIG. 5B illustrates a front elevation view of the rear wedge 38; FIG. 5C illustrates a side elevation view of the rear wedge 38; and FIG. 5D illustrates a perspective view of the rear wedge 38.

FIG. 5A illustrates that a top surface 80 of the rear wedge 38 is substantially rectangular. The width of the top surface 80 may be substantially the same as the combined widths of the top surfaces of the left cable wedge 32 and the right cable wedge 34.

FIG. 5B illustrates that the rear wedge 38 is shaped to include an arch-shaped indentation 82. A top portion of the arch-shaped indentation 82 forms a semi-circle having a radius substantially equal to a radius of a telecommunications cable. FIG. 5B also illustrates that the rear wedge 38 defines a fastener aperture 89 that extends through a front surface 84 of the rear wedge 38 and a rear surface 88 of the rear wedge 38. The fastener aperture 89 has a radius that is substantially equal to a radius of a fastener such as a screw or bolt. FIG. 5B also illustrates that the rear wedge 38 may have a honeycomb structure with openings on the front surface 84 of the rear wedge 38. The honeycomb structure may reduce the materials costs associated with the rear wedge 38 while maintaining the strength of the rear wedge 38.

FIG. 5C illustrates that the front surface 84 of the rear wedge 38 is slanted such that bottom surfaces 86 of the rear wedge 38 have less depth than the top surface 80 of the rear wedge 38. In other words, the front surface 84 of the rear wedge 38 forms an acute angle with the top surface 80 of the rear wedge 38 and an obtuse angle with the bottom surfaces 86 of the rear wedge 38. The angle of the slant of the front surface 84 of the rear wedge 38 may be substantially equal to the angle of the slant of the rear surface 68 of the left cable wedge 32 and the angle of the slant of the rear surface 78 of the right cable wedge 34.

Figure 6D:
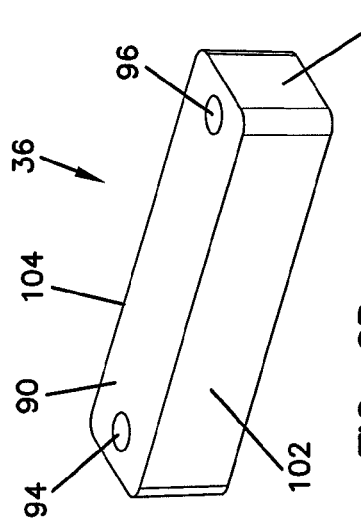
FIG. 6D is a perspective view of a bottom surface of the retention plate.
Figure 6E:
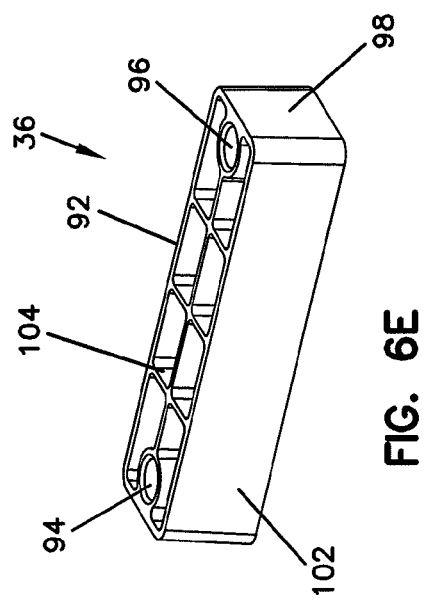
FIG. 6E is a perspective view of a top surface of the retention plate.
Figure 6C:
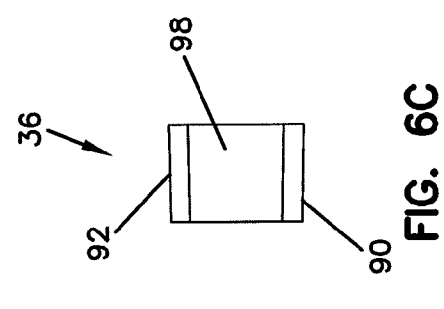
FIG. 6C is a side elevation view of the retention plate.
Figure 6A:
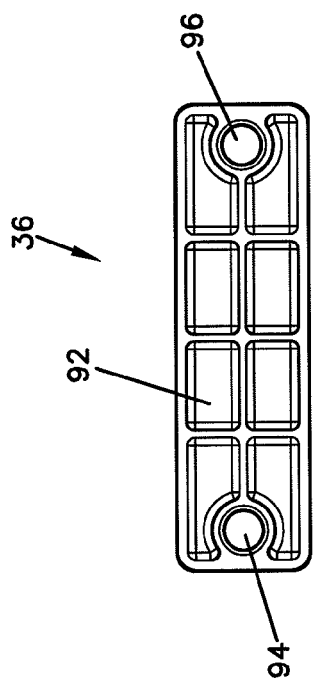
FIG. 6A is a top plan view of the retention plate.
Figure 6B:
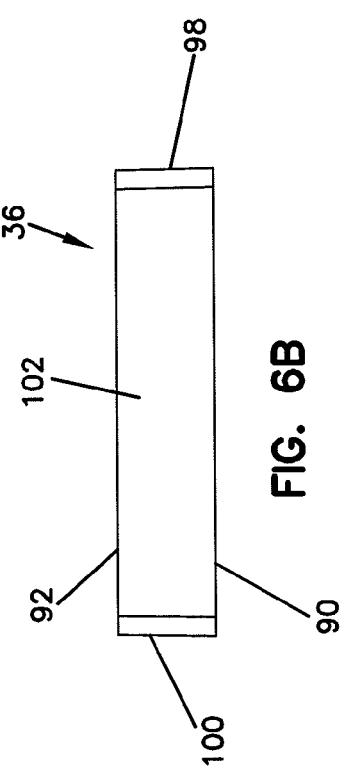
FIG. 6B is a front elevation view of the retention plate.

FIGS. 6A through 6D illustrate views of the retention plate 36: FIG. 6A is a top plan view of the retention plate 36; FIG. 6B is a front elevation view of the retention plate 36; FIG. 6C is a side elevation view of the retention plate 36; FIG. 6D is a perspective view of a bottom surface 90 of the retention plate 36; FIG. 6E is a perspective view of a top surface 92 of the retention plate 36.

FIG. 6A illustrates that the top surface 92 of the retention plate 36 is substantially rectangular in shape. Furthermore, FIG. 6A illustrates that the retention plate 36 defines a left fastener aperture 94 and a right fastener aperture 96 that pierce the top surface 92 of the retention plate. The left fastener aperture 94 and the right fastener aperture 96 may be cylindrical in shape and may extend vertically through the retention plate 36. The radius of the left fastener aperture 94 and the radius of the right fastener aperture 96 may be slightly larger than the radii of the fasteners 40. Accordingly, one of the fasteners 40 may be fitted through the left fastener aperture 94 and one of the fasteners 40 may be fitted through the right fastener aperture 96. FIG. 6A also illustrates that the retention plate 36 may have a honeycombed structure with openings on the top surface 92 of the retention plate 36. The honeycombed structure may reduce the materials cost of the retention plate 36 while maintaining the strength of the retention plate 36.

FIG. 6C, FIG. 6D, and FIG. 6E illustrate that side surfaces 98 and 100 of the retention plate 36 are substantially rectangular in shape and are parallel to one another. FIG. 6B, FIG. 6D, and FIG. 6E illustrate that a front surface 102 of the retention plate 36 is substantially rectangular in shape. Furthermore, FIG. 6D and FIG. 6E illustrate that a rear surface 104 of the retention plate 36 is substantially rectangular in shape and is parallel to the front surface 102 of the retention plate 36.

Figure 7A:
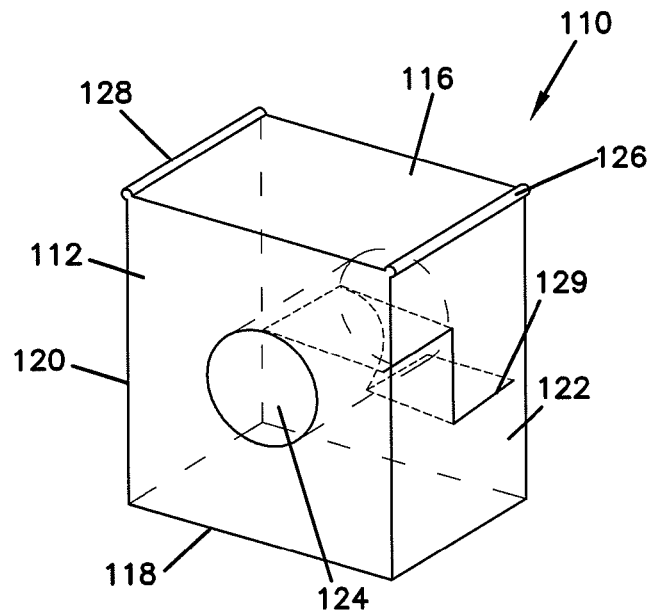
FIG. 7A is a perspective view of a gasket block in a first series of gasket blocks.

FIG. 7A is a perspective view of a gasket block 110 in a first series of gasket blocks. The gasket block 110 may be made of a variety of firm, but compressible, materials, such as rubber.

As illustrated in FIG. 7A, the gasket block 110 is substantially cuboid in shape. That is, the gasket block 110 has a front surface 112 that is rectangular in shape and a rear surface 114 that is the same shape as the front surface 112 and is oriented parallel to the front surface 112. Furthermore, the gasket block 110 has a top surface 116 that is rectangular in shape and a bottom surface 118 that is the same shape as the top surface 116 and is oriented parallel to the top surface 116. In addition, the gasket block 110 has a left side surface 120 that is rectangular in shape and a right side surface 122 that is the same shape as the left side surface 120 and is oriented parallel to the left side surface 120.

As illustrated in the example of FIG. 7A, the front surface 112 includes a circular cable aperture 124. The cable aperture 124 is positioned on the front surface 112 such that the center of the cable aperture 124 is the same as the center of the front surface 112. The cable aperture 124 extends cylindrically through the gasket block 110, emerging through the rear surface 114 of the gasket block 110. The center of the cable aperture 124 as it emerges through the rear surface 114 is the same as the center of the rear surface 114. Initially, the radius of the cable aperture 124 may be slightly longer than the radius of a telecommunications cable. It should be appreciated that the radius of the cable aperture 124 may be sized differently to accommodate different sizes and types of telecommunications cables.

The gasket block 110 has a height that is substantially equal to the heights of the left cable wedge 32, the right cable wedge 34, and the rear wedge 38. The gasket block 110 has a width that is substantially equal to the width of the sealing receptacle 42 of the base member 6. In one example implementation, the gasket block 110 initially has a depth such that the depth of the gasket block 110 plus the depth of the bottom surfaces 86 of the left cable wedge 32 (or the right cable wedge 34) plus the depth of the bottom surface of the rear wedge 38 is slightly longer than the depth of the sealing receptacle 42 in the base member 6. In another example implementation, the gasket block 110 initially has a depth such that the depth of the gasket block 110 plus the depth of the bottom surface of the left cable wedge 32 (or the right cable wedge 34) is substantially as long as the depth of the sealing receptacle 42.

As illustrated in the example of FIG. 7A, the gasket block 110 includes a flange 126 and a flange 128. Flange 126 extends outwardly from the junction of the top surface 116 of the gasket block 110 and the right side surface 122 of the gasket block 110. Flange 128 extends outwardly from the junction of the top surface 116 of the gasket block 110 and the left side surface 120 of the gasket block 110.

Furthermore, the gasket block 110 includes a slot 129 that extends from the right side surface 122 through the gasket block 110 to the cable aperture 124. During an installation process, an installer may temporarily widen the slot 129 and insert a telecommunications cable through the slot 129 and into the cable aperture 124. In this way, the installer is able to pass the telecommunications cable through the cable aperture 124 of the gasket block 110 without threading an end of the telecommunications cable through the cable aperture 124. This may be especially useful in situations in which one or more optical fibers in the telecommunications cable pass through the OTE 2 without interruption.

In the example of FIG. 7A, the slot 129 has a step-like shape. This shape may help to prevent environmental elements from entering the OTE 2 through the slot 129 because horizontal compression from the left cable wedge 32 and the right cable wedge 34 may tightly press together the two sides of the vertical segment of the slot 129. In addition, the sides of the horizontal segments of the slot 129 may press tightly together because the pressure from the left cable wedge 32 and the right cable wedge 34 deform the gasket block 110 to occupy any available space.

Figure 7B:
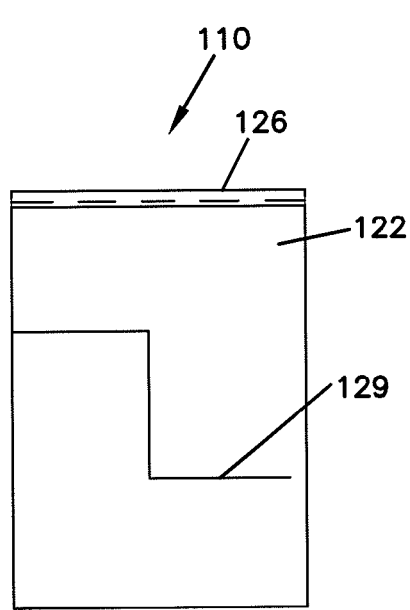
FIG. 7B is a side elevation view of the gasket block illustrated in FIG. 7A.
Figure 7C:
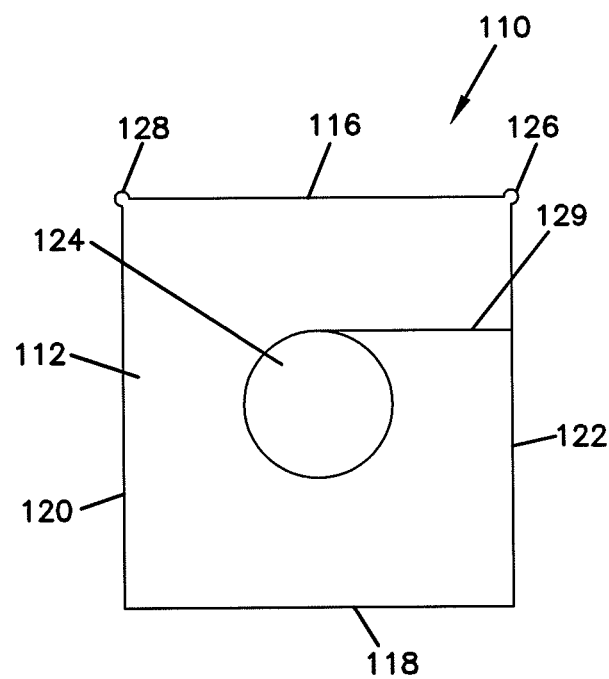
FIG. 7C is a front elevation view of the gasket block illustrated in FIG. 7A.

FIG. 7B is a side elevation view of the gasket block 110 illustrated in FIG. 7A. The example of FIG. 7B clearly shows the step-like shape of the slot 129. FIG. 7C is a front elevation view of the gasket block illustrated in FIG. 7A.

FIG. 7C is a perspective view of a second gasket block 130 in the first series of gasket blocks. The same components and steps used to install the gasket block 110 may be used to install the gasket block 130. The gasket block 130 may have the same shape as gasket block 110 (FIG. 7A). Unlike the gasket block 110, the gasket block 130 has two cable apertures 132. The cable apertures 132 may be sized to accommodate two drop cables instead of one telecommunications cable.

Figure 7D:
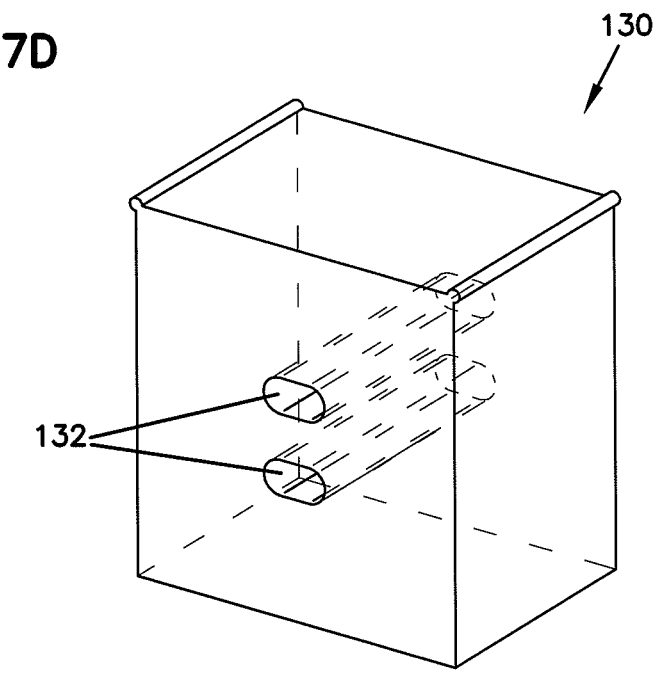
FIG. 7D is a perspective view of a second gasket block in the first series of gasket blocks.
Figure 7E:
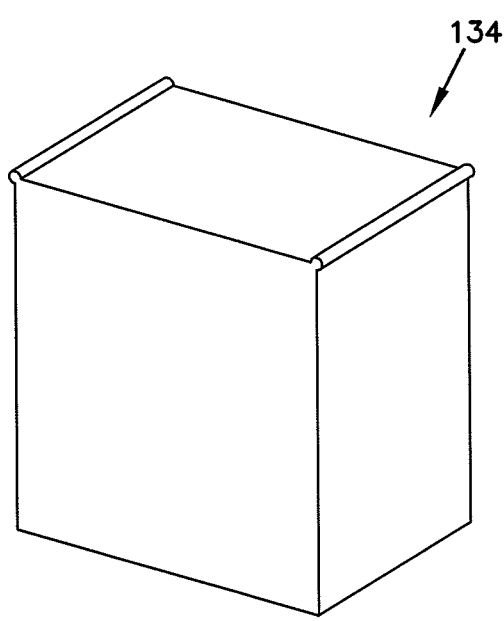
FIG. 7E is a perspective view of a third gasket block in the first series of gasket blocks.

FIG. 7D is a perspective view of a third gasket block 134 in the first series of gasket blocks. The gasket block 134 may have the same shape as the gasket block 110 (FIG. 7A) and the gasket block 130 (FIG. 7B). Unlike the gasket block 110 and the gasket block 130, the gasket block 134 has no cable apertures. For this reason, the gasket block 134 may be useful in sealing ones of the cable entry ports 22 that are not in use. The same components and steps used to install gasket block 110 may be used to install the gasket block 134, except that no telecommunications cable or drop cables are used.

Figure 8:
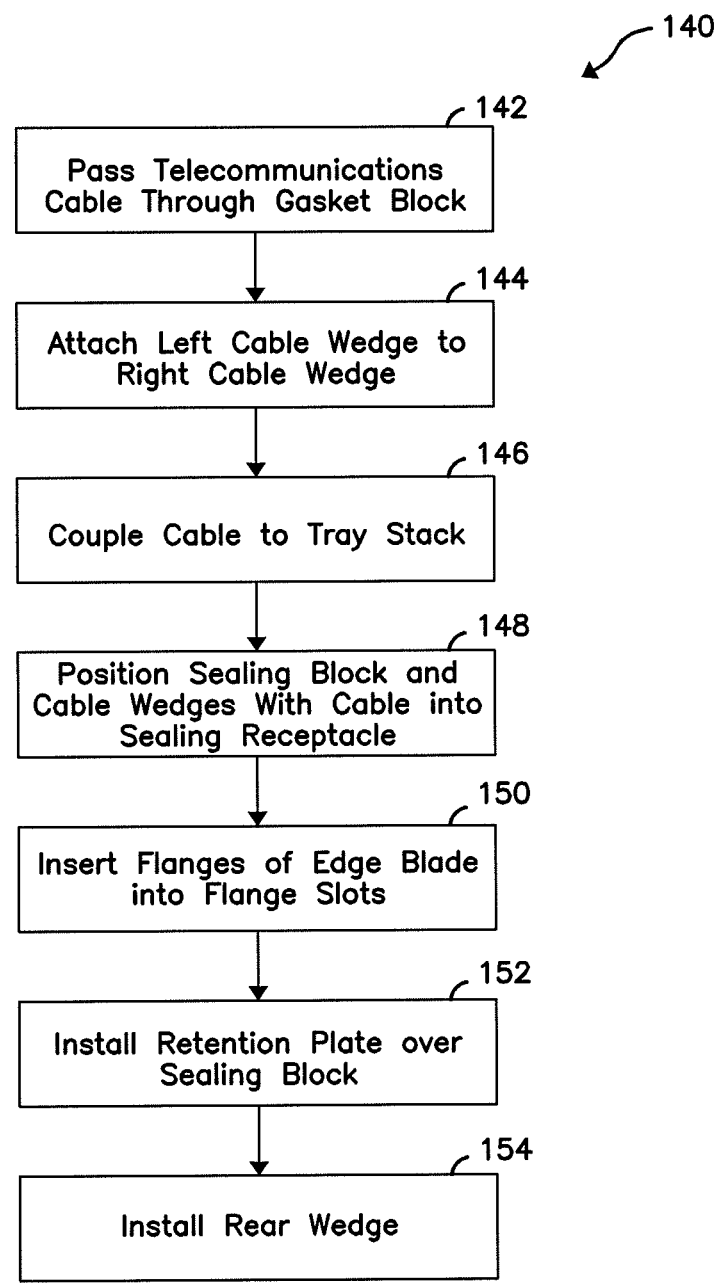
FIG. 8 is a flowchart illustrating an example installation process.

FIG. 8 is a flowchart illustrating an example installation process 140. One or more of the steps of the installation process 140 may be performed by a person and one or more of the steps of the installation process 140 may be performed by a machine. Alternatively, all of the steps of the installation process 140 may be performed by a person or all of the steps of the installation process 140 may be performed by a machine. For this reason, when this disclosure states that a step of the installation process 140 is performed by an "installer", it will be understood that the installer may be a person or a machine.

Initially, the installer passes a telecommunications cable through the cable aperture 124 of the gasket block 110 (142). For example, the installer may pass the telecommunications cable through the cable aperture 124 by inserting the telecommunications cable through slot 129 in the gasket block 110 into the cable aperture 124 of the gasket block. The installer is able to pass the telecommunications cable through the cable aperture 124 of the gasket block 110 because the initial radius of the cable aperture 124 of the gasket block 110 is slightly longer than the radius of the communications cable.

Next, the installer attaches the left cable wedge 32 to the right cable wedge 34 such that the right side of the left cable wedge 32 is flush with the left side of the right cable wedge 34 and such that the end of the telecommunications cable passes through the circle formed by the semi-circular indentation 62 of the left cable wedge 32 and the semi-circular indentation 72 of the right cable wedge 34 (144). As discussed above, when the left cable wedge 32 is attached to the right cable wedge 34, the latch 60 of the left cable wedge 32 may be inserted into an aperture on the left side of the right cable wedge 34, thereby latching the left cable wedge 32 to the right cable wedge 34. Furthermore, when the installer attaches the left cable wedge 32 to the right cable wedge 34, the left cable wedge 32 and the right cable wedge 34 are closer to the end of the telecommunications cable than the gasket block 110. Furthermore, the front surface 69 of the left cable wedge 32 loosely abuts and is aligned the rear surface 114 of the gasket block 110 and the front surface 79 of the right cable wedge 34 loosely abuts and is aligned with the rear surface 114 of the gasket block 110. The top surfaces of the left cable wedge 32 and the right cable wedge 34 are aligned with the top surface 116 of the gasket block 110.

The installer then couples the telecommunications cable to the tray stack 24 (146). The installer may couple the telecommunications cable to the tray stack 24 in a variety of different ways depending on the configuration of the telecommunications cable and the tray stack 24. For example, the telecommunications cable may include a plurality of separate optical fibers. In this example, each of the plurality of optical fibers may be coupled directly or indirectly to one of the splice trays in the tray stack 24. Alternatively, in this example, ones of the optical fibers may be coupled directly or indirectly to different ones of the splice trays in the tray stack 24.

After the installer couples the telecommunications cable to the tray stack 24, the installer may position the gasket block 110, along with the left cable wedge 32 and the right cable wedge 34, into the sealing receptacle 42 (148). When the installer inserts the gasket block 110, the left cable wedge 32, and the right cable wedge 34 into the sealing receptacle 42, the gasket block 110 is closest to the outside of the base member 6 and the left cable wedge 32 and the right cable wedge 34 are closest to the interior of the base member 6. Furthermore, the bottom surface 118 of the gasket block 110, the bottom surface of the left cable wedge 32, and the bottom surface of the right cable wedge 34 are flush with the floor of the sealing receptacle 42. In addition, the side surfaces of the gasket block 110, the left side surface of the left cable wedge 32, and the right side surface of the right cable wedge 34 are flush with the side walls of the sealing receptacle 42.

Next, the installer inserts the left flange 50A of the edge blade 30 into the left flange slot 54A of the base member 6 and inserts the right flange 50B of the edge blade 30 into the right flange slot 54B of the base member 6 (150). Because the bottom portion of the body 52 of the edge blade 30 is shaped as an arc having a radius that is approximately equal to the radius of the telecommunications cable, the bottom portion of the body 52 sits flush against telecommunications cable. Thus, the arc-shaped portion of the cable entry port 22A and the bottom portion of the body 52 of the edge blade 30 may form a circle surrounding the telecommunications cable.

The installer may then install the retention plate 36 (152). To install the retention plate 36, the installer positions the retention plate 36 into the retention plate receptacle 41 defined by the base member 6. The retention plate receptacle 41 is approximately as wide as the retention plate 36. In some implementations, the retention plate receptacle 41 is approximately as high as the retention plate 36. The retention plate receptacle 41 may have approximately the same depth as the retention plate 36. The base member 6 defines the retention plate receptacle 41 in a position such that when the retention plate 36 is installed, the retention plate 36 is positioned directly over the gasket block 110 when the gasket block 110 is positioned in the sealing receptacle 42. When the installer positions the retention plate 36 into the retention plate receptacle 41, the bottom surface 90 of the retention plate 36 may contact a portion of the top surface 116 of the gasket block 110 and may contact a portion of the top surfaces of the left cable wedge 32 and the right cable wedge 34. After positioning the retention plate 36 into the retention plate receptacle 41, the installer may insert one of the fasteners 40 through the left fastener aperture 94 of the retention plate 36 and one of the fasteners 40 through the right fastener aperture 96 of the retention plate 36. In the instance where the fasteners 40 are screws, the installer may then turn the fasteners 40 such that the fasteners 40 thread themselves into corresponding holes defined in the floor of the retention plate receptacle 41. In this way, the retention plate 36 is securely positioned over the gasket block 110, the left cable wedge 32, and the right cable wedge 34. Because the retention plate 36 is securely positioned over the gasket block 110, the left cable wedge 32, and the right cable wedge 34, the retention plate 36 inhibits the gasket block 110, the left cable wedge 32, the right cable wedge 34, and thereby the telecommunications cable, from moving in a direction away from the floor of the sealing receptacle 42. When the installer installs the retention plate 36 over the gasket block 110, the retention plate 36 may compress the flange 126 and the flange 128 of the gasket block 110, thereby sealing any gap that may exist between the bottom surface 90 of the retention plate 36 and the floor of the retention plate receptacle 41.

After the installer installs the retention plate 36, the installer installs the rear wedge 38 (154). When the installer installs the rear wedge 38, the installer initially positions the rear wedge 38 such that the front surface 84 of the rear wedge 38 loosely abuts the rear surface 68 of the left cable wedge 32 and the rear surface 78 of the right cable wedge 34. The rear surface 88 of the rear wedge 38 loosely abuts the rear wall of the sealing receptacle 42. The rear wedge 38 is oriented such that the bottom surfaces 86 of the rear wedge 38 are closest to the floor of the sealing receptacle 42. In this way, the arch-shaped indentation 82 accommodates the telecommunications cable.

After initially positioning the rear wedge 38, the installer pushes down on the rear wedge 38 toward the floor of the sealing receptacle 42. As a result of this pushing and slope of the front surface 84 of the rear wedge 38 sliding against the corresponding slopes of the rear surface 68 of the left cable wedge 32 and the rear surface 78 of the right cable wedge 34, the front surface 84 of the rear wedge 38 exerts force in an outward direction relative to the base member 6. As a result of the force exerted by the front surface 84 of the rear wedge 38, the left cable wedge 32 and the right cable wedge 34 slide in an outward direction relative to the base member 6. The left cable wedge 32 and the right cable wedge 34 in turn exert force on the gasket block 110. The gasket block 110 is prevented from sliding in the outward direction relative to the base member 6 by the outer wall of the sealing receptacle 42. Countervailing force exerted by the outer wall of the sealing receptacle 42 against the front surface 112 of the gasket block 110 and the force exerted by the front surface 69 of the left cable wedge 32 and the front surface 79 of the right cable wedge 34 compress the gasket block 110.

One consequence of this compression is that the gasket block 110 is forced into the space defined by the top flange 64 of the left cable wedge 32, the bottom flange 66 of the left cable wedge 32, the top flange 74 of the right cable wedge 34, and the bottom flange 76 of the right cable wedge 34. As a result of being forced into the space defined by these flanges, the gasket block 110 is compressed inwardly onto the telecommunications cable, thereby eliminating any space between the telecommunications cable and the wall of the cable aperture 124 of the gasket block 110. Because the space between the telecommunication cable and the wall of the cable aperture 124 of the gasket block 110 is eliminated, environmental elements are prevented from entering the OTE 2 through the cable aperture 124 of the gasket block 110. In other words, the gasket block 110 forms a seal around the telecommunications cable that passes through the gasket block 110.

Furthermore, as the gasket block 110 is compressed, the gasket block 110 is compressed against the outside wall of the sealing receptacle 42 and the body 52 of the edge blade 30. In this way, any space between the gasket block 110 and the outer wall of the sealing receptacle 42 and the body 52 of the edge blade 30 is eliminated. Because the space between the outer wall of the sealing receptacle 42 and the body 52 of the edge blade 30 is eliminated, environmental elements are prevented from entering the OTE 2 through gaps between the gasket block 110, the edge blade 30, and the outer wall of the sealing receptacle 42.

The installer may complete the installation of the rear wedge 38 by inserting a fastener (not shown) through the fastener aperture 89 of the rear wedge 38 and a corresponding fastener aperture defined in the inner wall of the sealing receptacle 42. Inserting the fastener through the fastener aperture 89 of the rear wedge 38 and the corresponding fastener aperture defined in the inner wall of the sealing receptacle 42 may prevent the rear wedge 38 from subsequently moving in a vertical direction relative to the floor of the sealing receptacle 42 and releasing the compression thereby.

Figure 9A:
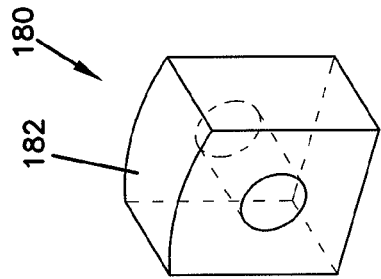
FIG. 9A is a perspective view of a first gasket block in a second series of alternative gasket blocks.
Figure 9B:
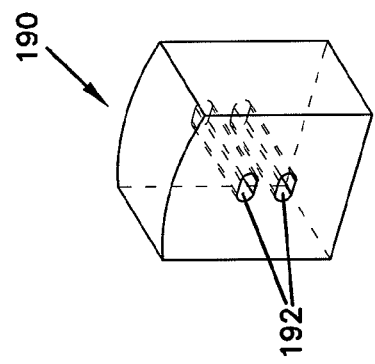
FIG. 9B is a perspective view of a second gasket block in the second series of alternative gasket blocks.
Figure 9C:
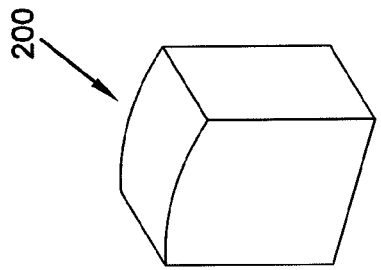
FIG. 9C is a perspective view of a third gasket block in the second series of alternative gasket blocks.

FIGS. 9A through 9C are perspective views of a second series of alternative gasket blocks that may be used to seal ones of the cable entry ports 22 of the OTE 2.

FIG. 9A is a perspective view of a first gasket block 180 in the second series of alternative gasket blocks. The same components and steps used to install gasket block 110 may be used to install gasket block 180. The gasket block 180 may have the same shape as the gasket block 110 except a top surface 182 of the gasket block 180 has a different shape than the top surface 116 of the gasket block 110. As illustrated in FIG. 9A, the top surface 182 is bowed upward in its midsection. In other words, the central portion of the top surface 182 of the gasket block 180 has greater height than the portions of the top surface 182 closer to the side surfaces of the gasket block 180.

Due to the fact that the top surface 182 of the gasket block 180 is bowed upward in its midsection, the gasket block 180 is compressed when the retention plate 36 is installed over the gasket block 180. This extra compression may result in the gasket block 180 forming a tighter seal around the telecommunications cable.

Although not illustrated in the example of FIG. 9A, it should be appreciated that the gasket block 180 may include a slot similar to slot 129 in gasket block 110 (FIG. 7A).

FIG. 9B is a perspective view of a second gasket block 190 in the second series of alternative gasket blocks. The same components and steps used to install the gasket block 110 may be used to install the gasket block 190. The gasket block 190 may have the same shape as the gasket block 180 (FIG. 9A). Unlike the gasket block 180, the gasket block 190 has two cable apertures 192. The cable apertures 192 may be sized to accommodate two drop cables instead of one telecommunications cable. In some circumstances, the two drop cables may include optical fibers that are optically spliced to optical fibers in one or more of the telecommunications cables.

FIG. 9C is a perspective view of a third gasket block 200 in the second series of alternative gasket blocks. The gasket block 200 may have the same shape as the gasket block 180 (FIG. 9A) and the gasket block 190 (FIG. 9B). Unlike the gasket block 180 and the gasket block 190, the gasket block 200 has no cable apertures. For this reason, gasket block 200 may be useful in sealing ones of the cable entry ports 22 that are not in use. The same components and steps used to install the gasket block 110 may be used to install the gasket block 190, except that no telecommunications cable or drop cables are used.

Figure 10A:
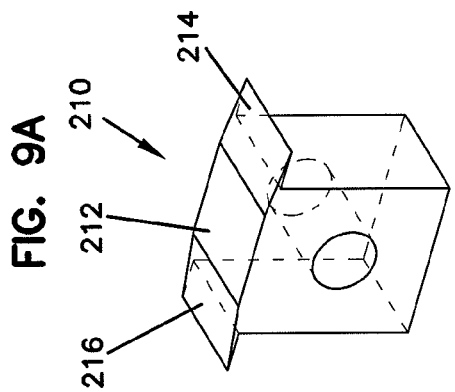
FIG. 10A is a perspective view of a first gasket block in the third series of alternative gasket blocks.
Figure 10B:
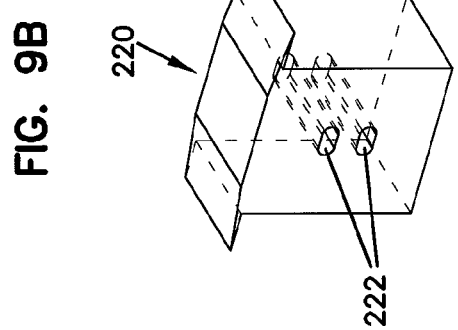
FIG. 10B is a perspective view of a second gasket block in the third series of alternative gasket blocks.
Figure 10C:
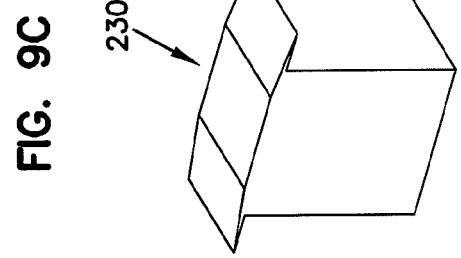
FIG. 10C is a perspective view of a third gasket block in the third series of alternative gasket blocks.

FIGS. 10A through 10C are perspective views of a third series of alternative gasket blocks that may be used to seal ones of the cable entry ports 22 of the OTE 2.

FIG. 10A is a perspective view of a first gasket block 210 in the third series of alternative gasket blocks. The same components and steps used to install the gasket block 110 may be used to install the gasket block 210. The gasket block 210 may have the same general shape as the gasket block 110 except a top surface 212 of the gasket block 210 has a different shape than the top surface 116 of the gasket block 110. As illustrated in FIG. 10A, the top surface 212 is bowed upward in its midsection. In other words, the central portion of the top surface 212 of the gasket block 210 has greater height than the portions of the top surface 212 closer to the side surfaces of the gasket block 210. Furthermore, FIG. 10A illustrates that the gasket block 210 includes a flange 214 and a flange 216 that extend the top surface 212 of the gasket block 210.

Due to the fact that the top surface 212 of the gasket block 210 is bowed upward in its midsection, the gasket block 210 is compressed when the retention plate 36 is installed over the gasket block 210. This extra compression may result in the gasket block 180 forming a tighter seal around the telecommunications cable. Furthermore, when the retention plate 36 is installed over the gasket block 210, the flange 214 and the flange 216 form a seal between the retention plate 36 and the floor of the retention plate receptacle 41. In another implementation, a gasket (not shown) that provides a seal between the lid member 4 and the base member 6 may be installed over the flange 214 and the flange 216. When the OTE 2 is closed, the flange 214 and the flange 216 may be compressed against this gasket, forming a seal between the gasket block 210 and the gasket. In this way, the flange 214 and the flange 216 may provide additional protection against the possibility of environmental elements entering the OTE 2.

Although not illustrated in the example of FIG. 10A, it should be appreciated that the gasket block 210 may include a slot similar to slot 129 in gasket block 110 (FIG. 7A).

FIG. 10B is a perspective view of a second gasket block 220 in the third series of alternative gasket blocks. The same components and steps used to install the gasket block 110 may be used to install the gasket block 220. The gasket block 220 may have the same shape as the gasket block 210 (FIG. 10A). Unlike the gasket block 210, the gasket block 220 has two cable apertures 222. The cable apertures 222 may be sized to accommodate two drop cables instead of one telecommunications cable.

FIG. 10C is a perspective view of a third gasket block 230 in the third series of alternative gasket blocks. The gasket block 230 may have the same shape as the gasket block 210 (FIG. 10A) and the gasket block 220 (FIG. 10B). Unlike the gasket block 210 and the gasket block 220, the gasket block 230 has no cable apertures. For this reason, the gasket block 230 may be useful in sealing ones of the cable entry ports 22 that are not in use. The same components and steps used to install the gasket block 110 may be used to install the gasket block 230, except that no telecommunications cable or drop cables are used.

FIGS. 11A through 11E illustrate views of an example alternate left cable wedge 260: FIG. 11A illustrates a top plan view of the alternate left cable wedge 260; FIG. 11B illustrates a front elevation view of the alternate left cable wedge 260; FIG. 11C illustrates a right side elevation view of the alternate left cable wedge 260; FIG. 11D illustrates a left side elevation view of the alternate left cable wedge 260; and FIG. 11E illustrates a perspective view of the alternate left cable wedge 260.

FIGS. 11A through 11E show that the alternate left cable wedge 260 is similar in shape to the left cable wedge 32 illustrated in FIGS. 3A through 3D. However, FIGS. 11A, 11B, 11C, and 11E illustrate that the alternate left cable wedge 260 has a peg 262 in place of the latch 60. In the examples of FIGS. 11A through 11E, the peg 262 is a round extension from the right side of the alternate left cable wedge 260. The peg 262 is slightly tapered such that the end furthest from the right side of the alternate left cable wedge 260 has a slightly smaller diameter than the end closest to the right side of the alternate left cable wedge 260.

FIGS. 11C and 11E illustrate that the alternate left cable wedge 260 also differs from the left cable wedge 32 in that the alternate left cable wedge 260 defines a peg aperture 264 on the right side of the alternate left cable wedge 260. The peg aperture 264 is approximately as deep as the peg 262 is long. The diameter of the peg aperture 264 is approximately the same as the average diameter of the peg 262.

Although not shown in FIGS. 11A through 11E, an alternate right cable wedge may have a peg extending from the left side of the alternate right cable wedge. The peg on the alternate right cable wedge may have approximately the same size and shape as the peg 262 on the alternate left cable wedge 260. The peg on the alternate right cable wedge is positioned on the alternate right cable wedge such that the peg on the alternate right cable wedge is insertable into the peg aperture 264 of the alternate left cable wedge 260. In addition, the alternate right cable wedge may define a peg aperture in the left side of the alternate right cable wedge. The peg aperture on the alternate right cable wedge may have approximately the same size and shape as the peg aperture 264 on the alternate left cable wedge 260. The peg aperture on the alternate right cable wedge is defined in the alternate right cable wedge such that the peg 262 on the alternate left cable wedge 260 is insertable into the peg aperture of the alternate right cable wedge. When the peg 262 of the alternate left cable wedge 260 is inserted into the peg aperture of the alternate right cable wedge and the peg of the alternate right cable wedge is inserted into the peg aperture 264 of the alternate left cable wedge 260, a top surface 266 of the alternate left cable wedge 260 is even with the top surface of the alternate right cable wedge, a bottom surface 268 of the alternate left cable wedge 260 is even with the bottom surface of the alternate right cable wedge, a rear surface 270 of the alternate left cable wedge 260 is even with the rear surface of the alternate right cable wedge, and a front surface 272 of the alternate left cable wedge 260 is even with the front surface of the alternate right cable wedge.

Figure 12E:
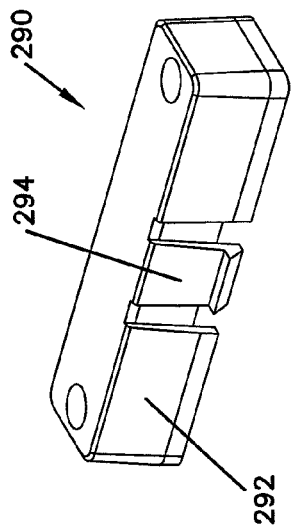
FIG. 12E is a perspective view of the bottom side of the alternate retention plate of FIG. 12A.
Figure 12F:
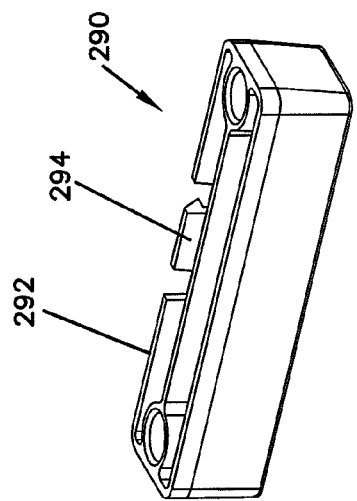
FIG. 12F is a perspective view of the top side of the alternate retention plate of FIG. 12A.
Figure 12D:
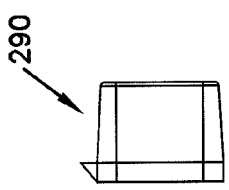
FIG. 12D is a side elevation view of the alternate retention plate of FIG. 12A.
Figure 12A:
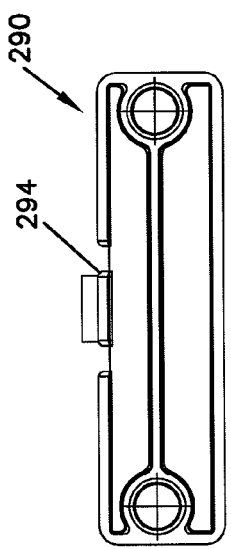
FIG. 12A is a top plan view of an alternate retention plate.
Figure 12C:
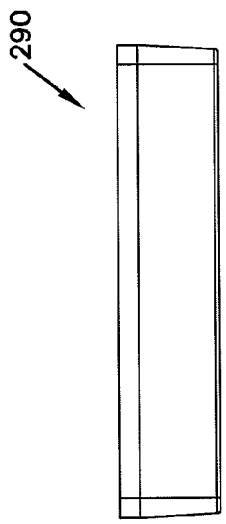
FIG. 12C is a front elevation view of the alternate retention plate of FIG. 12A.
Figure 12B:
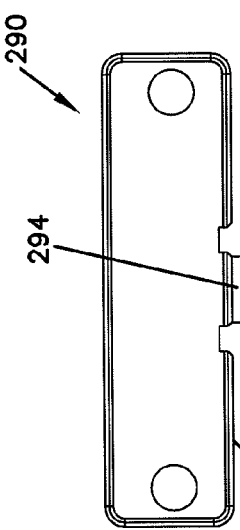
FIG. 12B is a bottom plane view of the alternate retention plate of FIG. 12A.

FIGS. 12A through 12F illustrate views of an example alternate retention plate 290: FIG. 12A is a top plan view of the alternate retention plate 290; FIG. 12B is a bottom plane view of the alternate retention plate 290; FIG. 12C is a front elevation view of the alternate retention plate 290; FIG. 12D is a side elevation view of the alternate retention plate 290; FIG. 12E is a perspective view of the bottom side of the alternate retention plate 290; and FIG. 12F is a perspective view of the top side of the alternate retention plate 290.

The alternate retention plate 290 and the retention plate 36 illustrated in FIGS. 6A through 6D may be similar in size, shape, and usage. However, unlike the rear surface 104 of the retention plate 36, a rear surface 292 of the alternate retention plate 290 defines a clip member 294. The clip member 294 has a flange 296 that extends outward from the top edge of the clip member 294.

When the installer is installing the rear wedge 38, the rear wedge 38 bends the clip member 294 inward toward the center of the retention plate 36. When the rear wedge 38 is fully installed in the sealing receptacle 42, the clip member 294 is able to snap back to the position illustrated in FIGS. 12A through 12F. The flange 296 on the clip member 294 is then able to prevent the rear wedge 38 from moving out of the sealing receptacle 42.

FIG. 13A through 13E illustrate views of another example alternate retention plate 310: FIG. 13A is a top plan view of the alternate retention plate 310; FIG. 13B is a rear elevation view of the alternate retention plate 310; FIG. 13C is a side elevation view of the alternate retention plate 310; FIG. 13D is a perspective view of the bottom side of the alternate retention plate 310; and FIG. 13E is a perspective view of the top side of the alternate retention plate 310.

The alternate retention plate 310 and the retention plate 36 illustrated in FIGS. 6A through 6D may be similar in size and shape. However, unlike the retention plate 36, the alternate retention plate 310 has a flange 312 that extends rearward from the junction of a rear surface 314 and a top surface 316 of the alternate retention plate 310.

FIG. 14 is a flowchart illustrating an alternate example installation process 320 that may be performed using the alternate retention plate 310 illustrated in the examples of FIGS. 13A through 13E. Steps 322 through 330 of the installation process 320 may be the same as steps 142 through 150 in the installation process 140 illustrated in the example of FIG. 8.

However, after the installer inserts the left flange 50A of the edge blade 30 into the left flange slot 54A of the base member 6 and inserts the right flange 50B of the edge blade 30 into the right flange slot 54B of the base member 6, the installer installs the rear wedge 38 (332). After the installer installs the rear wedge 38, the installer installs the alternate retention plate 310 into the retention plate receptacle 41 defined by the base member 6 (334). When the installer finishes installing the alternate retention plate 310, the flange 312 on the alternate retention plate 310 tightly abuts the top surface 80 of the rear wedge 38. In this way, the flange 312 prevents the rear wedge 38 from moving out of the sealing receptacle 42.

From the forgoing detailed description, it will be evident that modifications and variations can be made in the methods of the disclosure without departing from the spirit or scope of the disclosure.

What is claimed is:

1. An optical termination enclosure comprising:
a base member that defines an inner cavity, a sealing receptacle, and a cable entry port through which a telecommunications cable passes;
a gasket block positioned within the sealing receptacle, the gasket block defining a cable aperture through which the telecommunications cable passes,
wherein a bottom surface of the gasket block is flush with a floor of the sealing receptacle, a front surface of the gasket block is flush with an outer wall of the sealing receptacle, and side surfaces of the gasket block are flush with side walls of the sealing receptacle;
a retention plate that is installed over the gasket block such that a bottom surface of the retention plate is flush with a top surface of the gasket block;
a cable wedge positioned within the sealing receptacle interior to the gasket block, the cable wedge defining an aperture through which the telecommunications cable passes,
wherein a bottom surface of the cable wedge is flush with the floor of the sealing receptacle, a front surface of the cable wedge abuts a rear surface of the gasket block, and a rear surface of the cable wedge forms an obtuse angle with a top surface of the cable wedge and the rear surface of the cable wedge forms an acute angle with the bottom surface of the cable wedge;
a rear wedge positioned within the sealing receptacle interior to the gasket block, the rear wedge defining an indentation through which the telecommunications cable passes,
wherein a rear surface of the rear wedge is flush with an inner wall of the sealing receptacle, and
wherein a front surface of the rear wedge forms an acute angle with a top surface of the rear wedge and the front surface of the rear wedge forms an obtuse angle with a bottom surface of the rear wedge;
wherein the front surface of the rear wedge exerts force against the rear surface of the cable wedge, the front surface of the cable wedge exerts force against the rear surface of the gasket block, and the front surface of the gasket block exerts force against an outer wall of the sealing receptacle; and
wherein countervailing force exerted by the outer wall of the sealing receptacle against the front surface of the gasket block and the force exerted by the front surface of the cable wedge axially compress the gasket block, thereby radially constricting the cable aperture in the gasket block forming a seal around the telecommunication cable passing through the gasket block.

2. The optical termination enclosure of claim 1,
wherein the base member defines a left flange slot and a right flange slot positioned on opposite sides of the cable entry port;
wherein the optical termination enclosure further comprises an edge blade that comprises a left flange, a right flange, and a body;
wherein the left flange of the edge blade is positioned within the left flange slot and the right flange of the edge blade is positioned within the right flange slot; and
wherein the body of the edge blade has an arc-shaped lower portion that is flush with the telecommunications cable.

3. The optical termination enclosure of claim 1,
wherein the cable wedge comprises:
a top flange that extends horizontally from the junction of the top surface of the cable wedge and the front surface of the cable wedge; and
a bottom flange that extends horizontally from the junction of the bottom surface of the cable wedge and the front surface of the cable wedge; and
wherein the force exerted by the front surface of the rear wedge against the rear surface of the cable wedge causes the top flange of the cable wedge to slide over the top surface of the gasket block and causes the bottom flange of the cable wedge to slide under the bottom surface of the gasket block, thereby compressing the gasket block.

4. The optical termination enclosure of claim 1, wherein the retention plate compresses the gasket block.

5. The optical termination enclosure of claim 4,
wherein the gasket block comprises a first flange that extends outwardly from the junction of the top surface of the gasket block and a right side surface of the gasket block and a second flange that extends outwardly from the junction of the top surface of the gasket block and a left side surface of the gasket block; and
wherein the retention plate compresses the first flange and the second flange such that the first flange and the second flange seal a space between the gasket block and the retention plate.

6. The optical termination enclosure of claim 1,
wherein the base member defines a retention plate receptacle; and
wherein a fastener inserted through a fastener aperture defined by the retention plate fastens the retention plate into the retention plate receptacle.

7. The optical termination enclosure of claim 1,
wherein the cable aperture defined by the gasket block is a first cable aperture and the telecommunications cable is a first telecommunications cable;
wherein the gasket block defines a second cable aperture through which a second telecommunications cable is passed.

8. The optical termination enclosure of claim 1,
wherein the cable wedge comprises a left cable wedge and a right cable wedge;
wherein the left cable wedge has a semi-circular indentation on a right side surface of the left cable wedge and the right cable wedge has a semi-circular indentation on a left side surface of the right cable wedge; and
wherein when the left cable wedge is attached to the right cable wedge, the semi-circular indentation on the right side surface of the left cable wedge and the semi-circular indentation on the left side surface of the right cable wedge form the aperture through which the telecommunications cable passes.

9. The optical termination enclosure of claim 1, wherein a fastener prevents the rear wedge from moving in a vertical direction relative to the floor of the sealing receptacle.

10. The optical termination enclosure of claim 1, further comprising a stack of optical processing trays housed within the inner cavity of the base member, wherein an optical fiber within the telecommunications cable is coupled to an optical processing tray in the stack of optical processing trays.

11. The optical termination enclosure of claim 10, further comprising a lid member that is pivotally attached to the base member, the lid member housing a plurality of fiber optic adapters that optically connect drop cables to optical fibers within the optical termination enclosure that are connected to a splitter in the stack of optical processing trays.

12. A method of installing a telecommunications cable in an optical termination enclosure, the method comprising:
passing the telecommunications cable through a cable aperture defined by a gasket block;
passing the telecommunications cable through an aperture defined by a cable wedge such that a front surface of the cable wedge abuts a rear surface of the gasket block, wherein a rear surface of the cable wedge forms an obtuse angle with a top surface of the cable wedge and an acute angle with the bottom surface of the cable wedge;
coupling an end of the telecommunications cable to an optical processing tray housed within the optical termination enclosure;
positioning the gasket block and the cable wedge into a sealing receptacle defined by a base member of the optical termination enclosure such that a bottom surface of the gasket block and a bottom surface of the cable wedge are flush with a floor of the sealing receptacle, such that side surfaces of the gasket block and side surfaces of the cable wedge are flush with side walls of the sealing receptacle, and such that the telecommunications cable extends through a cable entry port defined by an outer wall of the base member, the outer wall of the base member forming an outer wall of the sealing receptacle;
after the gasket block and the cable wedge are positioned into the sealing receptacle, installing a retention plate over the gasket block, thereby inhibiting the gasket block from moving in a direction away from the floor of the sealing receptacle;
installing a rear wedge such that a front surface of the rear wedge abuts the rear surface of the cable wedge and such that a rear surface of the rear wedge abuts an inner wall of the sealing receptacle, wherein the front surface of the rear wedge forms an acute angle with a top surface of the rear wedge and an obtuse angle with a bottom surface of the rear wedge,
wherein when the rear wedge is installed, the front surface of the rear wedge exerts force against the rear surface of the cable wedge, the front surface of the cable wedge exerts force against the rear surface of the gasket block, and the front surface of the gasket block exerts force against the outer wall of the sealing receptacle;
wherein force exerted by the outer wall of the sealing receptacle against the front surface of the gasket block and the force exerted by the front surface of the cable wedge axially compress the gasket block, thereby radially constricting the cable aperture in the gasket block forming a seal around the telecommunication cable passing through the gasket block.

13. The method of claim 12, further comprising:
inserting a left flange of an edge blade into a left flange slot defined by the base member;
inserting a right flange of the edge blade into a right flange slot defined by the base member;
wherein the edge blade comprises a body having an arc-shaped lower portion that, when the left flange is inserted into the left flange slot and the right flange is inserted into the right flange slot, the arc-shaped lower portion of the body of the edge blade is flush with the telecommunications cable.

14. The method of claim 12, wherein installing the rear wedge causes a top flange that extends a top surface of the cable wedge to slide over a top surface of the gasket block and causes a bottom flange that extends the bottom surface of the cable wedge to slide under the bottom surface of the gasket block, thereby compressing the gasket block.

15. The method of claim 12, wherein installing the retention plate comprises compressing the gasket block.

16. The method of claim 15,
wherein the gasket block includes a first flange that extends outwardly from the junction of the top surface of the gasket block and a right side surface of the gasket block and a second flange that extends outwardly from the junction of the top surface of the gasket block and a left side surface of the gasket block; and
wherein compressing the gasket block comprises compressing the first flange and the second flange such that the first flange and the second flange seal a space between the gasket block and the retention plate.

17. The method of claim 12, wherein installing the retention plate comprises using fasteners inserted through fastener apertures defined by the retention plate to fasten the retention plate into a retention plate receptacle defined by the base member.

18. The method of claim 12,
wherein the cable aperture defined by the gasket block is a first cable aperture and the telecommunications cable is a first telecommunications cable;
wherein the method further comprises passing a second telecommunications cable through a second cable aperture in the gasket block; and
wherein when the rear wedge is installed, the gasket block forms a seal around the second telecommunication cable.

19. The method of claim 12, wherein passing the telecommunications cable through an aperture defined by the cable wedge comprises attaching a left cable wedge to a right cable wedge, thereby forming the cable wedge,
wherein the left cable wedge has a semi-circular indentation on a right side surface of the left cable wedge and the right cable wedge has a semi-circular indentation on a left side surface of the right cable wedge, and
wherein when the left cable wedge is attached to the right cable wedge, the semi-circular indentation on the right side surface of the left cable wedge and the semi-circular indentation on the left side surface of the right cable wedge forms the aperture through which the telecommunications cable is passed.

* * * * *